(12) United States Patent
Bansal et al.

(10) Patent No.: US 11,941,648 B2
(45) Date of Patent: Mar. 26, 2024

(54) ROADSIDE SERVICE ESTIMATES BASED ON WIRELESS VEHICLE DATA

(71) Applicant: TOYOTA JIDOSHA KABUSHIKI KAISHA, Toyota (JP)

(72) Inventors: Gaurav Bansal, Mountain View, CA (US); Hongsheng Lu, Mountain View, CA (US); John Kenney, Mountain View, CA (US); Toru Nakanishi, Toyota (JP)

( * ) Notice: Subject to any disclaimer, the term of this patent is extended or adjusted under 35 U.S.C. 154(b) by 129 days.

(21) Appl. No.: 16/295,868

(22) Filed: Mar. 7, 2019

(65) Prior Publication Data

US 2019/0205907 A1 Jul. 4, 2019

Related U.S. Application Data

(63) Continuation of application No. 15/159,391, filed on May 19, 2016, now Pat. No. 10,423,971.

(51) Int. Cl.
*G06Q 30/0202* (2023.01)
*G06Q 50/30* (2012.01)
(Continued)

(52) U.S. Cl.
CPC ......... *G06Q 30/0202* (2013.01); *G07C 5/008* (2013.01); *H04W 4/06* (2013.01); *H04W 4/80* (2018.02); *G06Q 50/30* (2013.01)

(58) Field of Classification Search
None
See application file for complete search history.

(56) References Cited

U.S. PATENT DOCUMENTS

| | | | |
|---|---|---|---|
| 7,590,261 B1 * | 9/2009 | Mariano | G06K 9/00785 382/103 |
| 8,705,527 B1 * | 4/2014 | Addepalli | H04W 48/02 370/389 |

(Continued)

FOREIGN PATENT DOCUMENTS

| | | | | |
|---|---|---|---|---|
| CN | 104859662 A | * | 8/2015 | ........ B60W 50/0225 |
| JP | 2003022303 A | * | 1/2003 | |

(Continued)

OTHER PUBLICATIONS

Guo et al., "A Lane-Level LBS System for Vehicle Network with High-Precision BDS/GPS Positioning," Computational Intelligence and Neuroscience, vol. 2015, Article ID 531321 (Year: 2015), 14 pages.

*Primary Examiner* — Mehmet Yesildag
(74) *Attorney, Agent, or Firm* — Burbage Law, P.C.; Jon-Michael Burbage

(57) ABSTRACT

The disclosure includes implementations for providing a recommendation to a driver of a second DSRC-equipped vehicle. The recommendation may describe an estimate of how long it would take the second DSRC-equipped vehicle to receive a roadside service from a drive-through business. A method according to some implementations may include receiving, by the second DSRC-equipped vehicle, a Dedicated Short Range Communication message ("DSRC message") that includes path history data. The path history data may describe a path of a first DSRC-equipped vehicle over a plurality of different times while the first DSRC-equipped vehicle is located in a queue of the drive-through business. The method may include determining delay time data for the second DSRC-equipped vehicle based on the path history data for the first DSRC-equipped vehicle. The delay time data may describe the estimate. The method may include (Continued)

providing the recommendation to the driver. The recommendation may include the estimate.

20 Claims, 9 Drawing Sheets

(51) Int. Cl.
*G07C 5/00* (2006.01)
*H04W 4/06* (2009.01)
*H04W 4/80* (2018.01)

(56) References Cited

U.S. PATENT DOCUMENTS

| | | | | |
|---|---|---|---|---|
| 2002/0152115 | A1* | 10/2002 | Morita | G08G 1/096741 |
| | | | | 705/13 |
| 2003/0120420 | A1* | 6/2003 | D'Amico | G01C 21/26 |
| | | | | 701/400 |
| 2004/0024650 | A1* | 2/2004 | Chen | G06Q 30/0617 |
| | | | | 705/26.43 |
| 2008/0118110 | A1* | 5/2008 | Simonsson | G06K 9/033 |
| | | | | 382/104 |
| 2010/0174474 | A1* | 7/2010 | Nagase | G08G 1/01 |
| | | | | 701/118 |
| 2012/0109760 | A1* | 5/2012 | Koiso | G06Q 50/12 |
| | | | | 705/15 |
| 2013/0169813 | A1* | 7/2013 | Schaefer | B60C 11/24 |
| | | | | 348/148 |
| 2014/0119210 | A1* | 5/2014 | Bansal | H04W 28/021 |
| | | | | 370/252 |
| 2014/0136329 | A1* | 5/2014 | Chang | G06Q 50/30 |
| | | | | 705/14.62 |
| 2015/0035685 | A1* | 2/2015 | Strickland | B60Q 1/525 |
| | | | | 340/901 |
| 2015/0088738 | A1* | 3/2015 | Cateland | G06Q 20/40 |
| | | | | 705/41 |
| 2015/0124096 | A1* | 5/2015 | Koravadi | G06K 9/00825 |
| | | | | 348/148 |
| 2016/0086285 | A1* | 3/2016 | Jordan Peters | G08G 1/096827 |
| | | | | 705/4 |
| 2016/0171521 | A1* | 6/2016 | Ramirez | G06Q 10/0635 |
| | | | | 701/409 |
| 2017/0200197 | A1* | 7/2017 | Brubaker | G06Q 30/0275 |

FOREIGN PATENT DOCUMENTS

| | | |
|---|---|---|
| JP | 2004-157917 | 6/2004 |
| JP | 2005284931 A * | 10/2005 |
| JP | 2006-031421 | 2/2006 |
| JP | 2006-252533 A | 9/2006 |
| JP | 2015-032312 | 2/2015 |

* cited by examiner

BSM DATA 195

- Vehicles and other client devices equipped with Direct Short Range Communication ("DSRC") transmit a Basic Safety Message ("BSM") at a regular interval.

- Each BSM includes the following BSM data describing one or more of the following for the vehicle that originally sent the BSM:
  (1) GPS Data Describing the Location of the Vehicle, where the GPS Data may be so accurate that it describes the specific lane (e.g., a drive-through lane) the Vehicle is traveling in;
  (2) Heading Data Describing the Direction of travel for the Vehicle;
  (3) Velocity Data Describing the Velocity of the Vehicle; and
  (4) Path History of Vehicle (e.g., path history data).

Figure 4A

BSM DATA 195

Part 1
Vehicle Position Data (local 3D)
- Latitude
- Longitude
- Elevation
- Positional accuracy
- Time Vehicle Motion Data
- Transmission state
- Speed
- Heading
- Steering wheel angle
- Acceleration set (4-way, i.e., 3 axes of acceleration plus yaw rate
- Brake system status Vehicle Size Data

Part 2
Vehicle Path History
Future Vehicle Path Estimation
Hard Active Braking
Traction Control System active over 100 milliseconds?
Antilock Brake System active over 100 milliseconds?
Light Status
Wiper Status
Vehicle type

Figure 4B

ROADSIDE SERVICE ESTIMATES BASED ON WIRELESS VEHICLE DATA

CROSS-REFERENCE TO RELATED APPLICATIONS

This patent application is a continuation of U.S. patent application Ser. No. 15/159,391, entitled "Roadside Service Estimates Based on Wireless Vehicle Data" filed on May 19, 2016, the entirety of which is hereby incorporated by reference.

BACKGROUND

The specification relates to roadside service estimates based on wireless vehicle data. The roadside service estimates may be provided to a connected vehicle that is equipped with Dedicated Short Range Communication.

Research shows that wait times at drive-through businesses is an important problem that affects the satisfaction and spending habits of vehicle drivers. There are few modern technical innovations that are designed to address this problem.

SUMMARY

Described are implementations that include a system and method for providing an estimate of how long it will take for a driver of a vehicle to receive a roadside service (or the delay in receiving a roadside service) using wireless vehicle data included in a Dedicated Short Range Communication ("DSRC") message.

In some implementations, the DSRC message may be a Basic Safety Message ("BSM") that is transmitted via DSRC.

In some implementations, the roadside service may include any service provided by a roadside business that includes drive-through (e.g., fuel stations, vehicle dealers that service vehicles, oil change service, tire rotation service, fast food restaurants, banks, automatic teller machines ("ATMs"), car washes, parking lots, etc.).

In some implementations, a DSRC-equipped vehicle may include a vehicle that includes one or more of the following elements: a DSRC transceiver and any software or hardware necessary to encode and transmit a DSRC message; and a DSRC receiver and any software or hardware necessary to receive and decode a DSRC message.

In some implementations, devices other than vehicles may be DSRC-equipped. For example, a roadside unit ("RSU") or any other communication device may be DSRC-equipped if it includes one or more of the following elements: a DSRC transceiver and any software or hardware necessary to encode and transmit a DSRC message; and a DSRC receiver and any software or hardware necessary to receive and decode a DSRC message.

A system of one or more computers can be configured to perform particular operations or actions by virtue of having software, firmware, hardware, or a combination of them installed on the system that in operation causes or cause the system to perform the actions. One or more computer programs can be configured to perform particular operations or actions by virtue of including instructions that, when executed by data processing apparatus, cause the apparatus to perform the actions.

One general aspect includes a method including: collecting, by a sensor set included in a first DSRC-equipped vehicle, sensor data that describes a plurality of locations of the first DSRC-equipped vehicle at a plurality of different times while the first DSRC-equipped vehicle is located in a queue of a drive-through business that provides a roadside service; building, by the first DSRC-equipped vehicle, path history data based on the sensor data, where the path history data describes a path of the first DSRC-equipped vehicle over the plurality of different times; wirelessly transmitting, by the first DSRC-equipped vehicle, a DSRC message that includes the path history data to a second DSRC-equipped vehicle; receiving the DSRC message by the second DSRC-equipped vehicle; determining, by the second DSRC-equipped vehicle, delay time data based on the path history data included in the DSRC message, where the delay time data describes an estimate of how long it would take the second DSRC-equipped vehicle to receive the roadside service from the drive-through business; and providing, by the second DSRC-equipped vehicle, a recommendation to a driver of the second DSRC-equipped vehicle, where the recommendation describes the estimate of how long it would take the second DSRC-equipped vehicle to receive the roadside service from the drive through business. Other embodiments of this aspect include corresponding computer systems, apparatus, and computer programs recorded on one or more computer storage devices, each configured to perform the actions of the methods.

Implementations may include one or more of the following features. The method where the DSRC message is a basic safety message. The method where the sensor set includes a DSRC-compliant global positioning system ("GPS") unit. The method where the DSRC message is a basic safety message. Implementations of the described techniques may include hardware, a method or process, or computer software on a computer-accessible medium.

One general aspect includes a method including: receiving, by a second DSRC-equipped vehicle, a DSRC message that includes path history data describing a path of a first DSRC-equipped vehicle over a plurality of different times while the first DSRC-equipped vehicle is located in a queue of a drive-through business that provides a roadside service; determining, by the second DSRC-equipped vehicle, delay time data based on the path history data included in the DSRC message, where the delay time data describes an estimate of how long it would take the second DSRC-equipped vehicle to receive the roadside service from the drive-through business; and providing, by the second DSRC-equipped vehicle, a recommendation to a driver of the second DSRC-equipped vehicle, where the recommendation describes the estimate of how long it would take the second DSRC-equipped vehicle to receive the roadside service from the drive through business. Other embodiments of this aspect include corresponding computer systems, apparatus, and computer programs recorded on one or more computer storage devices, each configured to perform the actions of the methods.

Implementations may include one or more of the following features. The method where the DSRC message is a basic safety message. The method where the path history data describes a plurality of different locations of the first DSRC-equipped vehicle with a lane-level degree of precision. The method where the lane-level degree of precision is accurate to within substantially plus or minus 1.5 meters. The method where the DSRC message is transmitted by the first DSRC-equipped vehicle. The method where the DSRC message is transmitted by a stationary DSRC-enabled communication device. The method where the stationary DSRC-enabled communication device is installed within substantially 1,000 meters of a location of the first DSRC-equipped vehicle while the first DSRC-equipped vehicle is present in the queue so that the stationary DSRC-enabled communication device wirelessly receives the path history data from the first DSRC-equipped vehicle via DSRC communication between the stationary DSRC-enabled communication device and the first DSRC-equipped vehicle. The method where determining the delay time data based on the path history data included in the DSRC message further includes: determining how long the first DSRC-equipped vehicle has been waiting in the queue; determining how far the first DSRC-equipped vehicle has traveled while waiting in the queue; estimating how many vehicles are ahead of the first DSRC-equipped vehicle in the queue; estimating how many vehicles are behind the first DSRC-equipped vehicle in the queue; and determining how long it would take the second DSRC-equipped vehicle to receive the roadside service from the drive through business based on one or more of (1) how long the first DSRC-equipped vehicle has been waiting in the queue, (2) how far the first DSRC-equipped vehicle has traveled while waiting in the queue, (3) how many vehicles are ahead of the first DSRC-equipped vehicle in the queue and (4) how many vehicles are behind the first DSRC-equipped vehicle in the queue. The method where the path history data further describes (1) how long the first DSRC-equipped vehicle has been waiting in the queue, (2) how far the first DSRC-equipped vehicle has traveled while waiting in the queue, (3) a first estimate of how many vehicles are ahead of the first DSRC-equipped vehicle in the queue and (4) a second estimate of how many vehicles are behind the first DSRC-equipped vehicle in the queue. The method where the DSRC message includes the delay time data. The method where providing the recommendation includes cause a monitor to display a graphical user interface that graphically describes the recommendation. The method where providing the recommendation includes causing a speaker to generate audio that audibly describes the recommendation. Implementations of the described techniques may include hardware, a method or process, or computer software on a computer-accessible medium.

One general aspect includes a system including: a DSRC receiver of a second DSRC-equipped vehicle that is operable to receive a DSRC message that includes path history data describing a path of a first DSRC-equipped vehicle over a plurality of different times while the first DSRC-equipped vehicle is located in a queue of a drive-through business that provides a roadside service; an onboard vehicle computer system of the second DSRC-equipped vehicle that is communicatively coupled to the DSRC receiver to receive the path history data from the DSRC receiver, the onboard vehicle computer system including a non-transitory memory storing computer code which, when executed by the onboard vehicle computer system causes the onboard vehicle computer system to: determine delay time data based on the path history data, where the delay time data describes an estimate of how long it would take the second DSRC-equipped vehicle to receive the roadside service from the drive-through business; and provide a recommendation to a driver of the second DSRC-equipped vehicle, where the recommendation describes the estimate of how long it would take the second DSRC-equipped vehicle to receive the roadside service from the drive through business. Other embodiments of this aspect include corresponding computer systems, apparatus, and computer programs recorded on one or more computer storage devices, each configured to perform the actions of the methods.

Implementations may include one or more of the following features. The system where the DSRC message is a basic safety message. The system where the path history data describes a plurality of different locations of the first DSRC-equipped vehicle with a lane-level degree of precision. The system where the lane-level degree of precision is accurate to within substantially plus or minus 1.5 meters. The system where the DSRC message is transmitted by the first DSRC-equipped vehicle. The system where the DSRC message is transmitted by a stationary DSRC-enabled communication device. The system where the stationary DSRC-enabled communication device is installed within substantially 1,000 meters of a location of the first DSRC-equipped vehicle while the first DSRC-equipped vehicle is present in the queue so that the stationary DSRC-enabled communication device wirelessly receives the path history data from the first DSRC-equipped vehicle via DSRC communication between the stationary DSRC-enabled communication device and the first DSRC-equipped vehicle. Implementations of the described techniques may include hardware, a method or process, or computer software on a computer-accessible medium.

BRIEF DESCRIPTION OF THE DRAWINGS

The disclosure is illustrated by way of example, and not by way of limitation in the figures of the accompanying drawings in which like reference numerals are used to refer to similar elements.

FIG. 4A is a block diagram illustrating an example of BSM data according to some implementations.

FIG. 4B is a block diagram illustrating an example of BSM data according to some implementations.

DETAILED DESCRIPTION

Figure 1A:
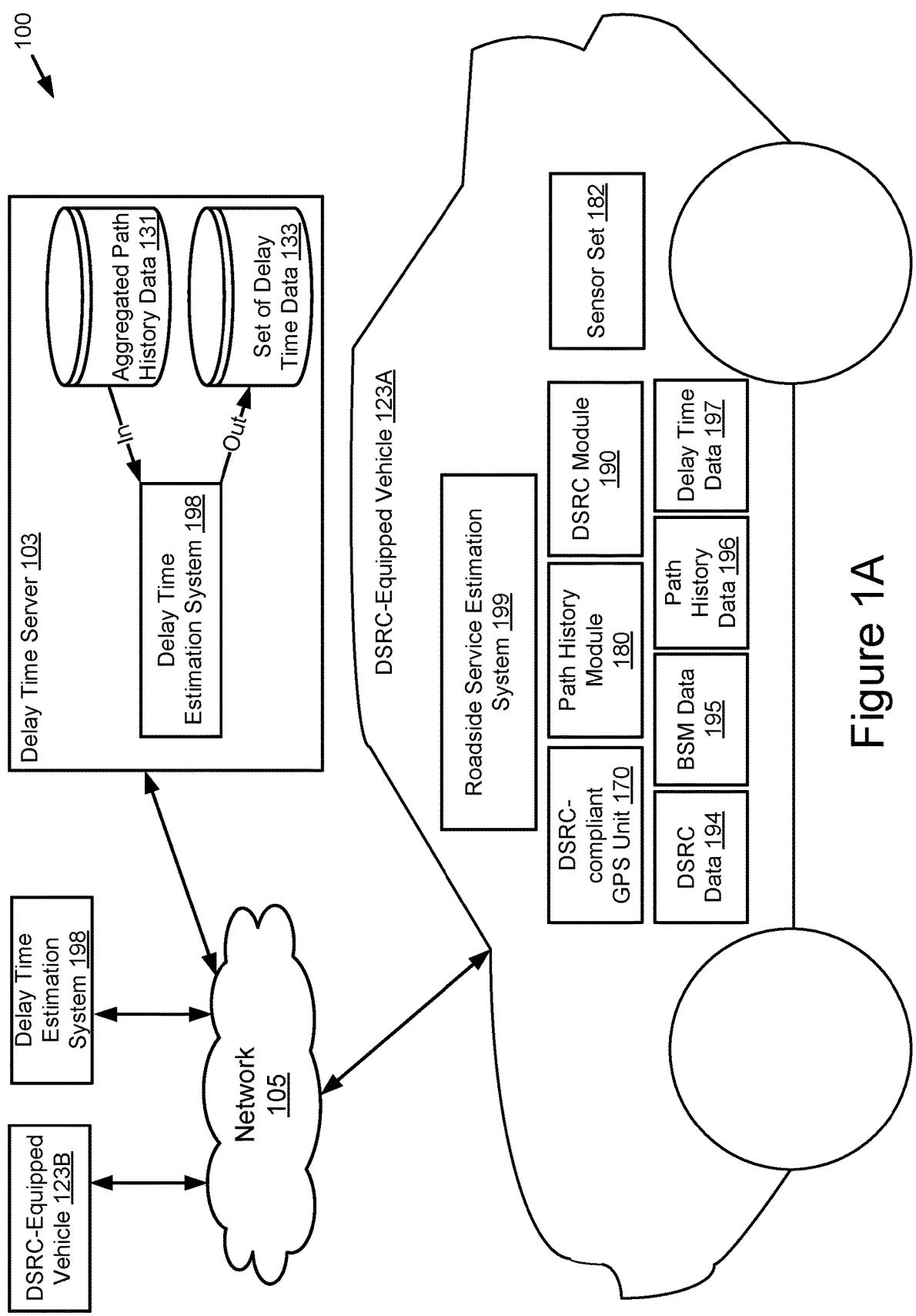
FIGS. 1A through 1D are block diagrams illustrating operating environments for one or more vehicles including a roadside service estimation system according to some implementations.

Assume that a vehicle is traveling down a roadway. The driver of the vehicle may desire to stop at a roadside business to receive a service. For example, the driver may desire to stop at a drive-through restaurant to purchase a meal. However, the driver may be unsure about whether they should stop at this drive-through business. For example, they may have an appointment to keep and have uncertainty about whether stopping at this drive-through restaurant will cause them to be late for their meeting. Currently the driver must usually make a guess about whether they have time to stop at the drive-through restaurant. Research shows that most drivers will choose to skip stopping at the drive-through business in these situations.

Vehicles are increasingly equipped with Dedicated Short Range Communication ("DSRC"). A vehicle equipped with DSRC may be referred to as "DSRC-equipped." A DSRC-equipped vehicle may include a DSRC antenna and any hardware of software necessary to send and receive DSRC messages, generate DSRC messages and read DSRC messages. For example, a DSRC-equipped vehicle may include any hardware or software necessary to receive a DSRC message, retrieve data included in the DSRC message and read the data included in the DSRC message.

In some implementations, the roadside service estimation system described herein may assist a driver of a DSRC-equipped vehicle to determine whether to stop at a drive-through business using information encoded in one or more DSRC messages.

There are many types of DSRC messages. One type of DSRC message is known as a Basic Safety Message ("BSM" if singular or "BSMs" if plural). DSRC-equipped vehicles broadcast a BSM at a regular interval. The interval may be user adjustable.

A BSM includes BSM data. The BSM data describes attributes of the vehicle that originally transmitted the BSM message. Vehicles equipped with DSRC may broadcast BSMs at an adjustable rate. In some implementations, the rate may be once every 0.10 seconds. The BSM includes BSM data that describes, among other things, one or more of the following: (1) the path history of the vehicle that transmits the BSM; (2) the speed of the vehicle that transmits the BSM; and (3) the global positioning system data ("GPS data") describing a location of the vehicle that transmits the BSM. FIGS. 4A and 4B depict examples of BSM data according to some implementations. FIGS. 4A and 4B are described below.

In some implementations, DSRC-equipped vehicles may probe other DSRC-equipped vehicles/devices along the roadway for information describing their current and future conditions, including their path history and future path. This information is described as "DSRC probe data." DSRC probe data may include any data received via a DSRC probe or responsive to a DSRC probe.

A DSRC message may include DSRC-based data. The DSRC-based data may include BSM data or DSRC probe data. In some implementations, the DSRC-based data included in a DSRC message may include BSM data or DSRC probe data received from a plurality of DSRC-equipped vehicles (or other DSRC-equipped devices). This BSM data or DSRC probe data may include an identifier of its source and the location of the source or any traffic events described by the BSM data or DSRC probe data.

In some implementations, the DSRC-enabled vehicles will include a DSRC-compliant GPS unit. The BSM data or DSRC probe data may specify which lane a vehicle is traveling in as well as its speed of travel and path history. The lane may include a lane of a drive-through business.

Vehicles are also increasingly manufactured to include GPS-based navigation systems. A GPS-based navigation system may provide navigation routes to a driver that are based on GPS data and knowledge about queue lengths along roadways.

Described herein are implementations of a roadside service estimation system for providing an estimate of how long it will take for a driver of a vehicle to receive a roadside service (or the delay in receiving a roadside service) using wireless vehicle data that is included in a DSRC message.

In some implementations, the roadside service may include any service provided by a roadside business that includes drive-through (e.g., fuel stations, vehicle dealers that service vehicles, oil change service, tire rotation service, fast food restaurants, banks, ATMs, car washes, parking lots, etc.).

Research shows that wait times at drive-through businesses are an important problem that affects the satisfaction and spending habits of drivers. The roadside service estimation system described herein solves this problem using information included in a wireless message such as a DSRC message. The DSRC message may be a standard DSRC message, a DSRC probe or a BSM.

Example Path History Data

Assume a DSRC-equipped vehicle is waiting in line at a drive-through. The DSRC-equipped vehicle may record path history data describing a path history of the DSRC-equipped vehicle while waiting in line.

In some implementations, the path history data may describe one or more of the following: (1) how long the DSRC-equipped vehicle has been waiting in line; (2) how far the DSRC-equipped vehicle has traveled during the entire time period it has been waiting in line; (3) how far the DSRC-equipped vehicle has traveled in line during some fixed time period configured to capture recent changes in queue speed (e.g., 10 seconds, 11 seconds, etc.); (4) an estimate of how many vehicles are ahead of the DSRC-equipped vehicle in line (e.g., the DSRC-equipped vehicle may include cameras that can take external pictures of the vehicle environment that may be used to determine how many vehicles are ahead of the DSRC-equipped vehicle in line); (5) an estimate of how many vehicles are behind the DSRC-equipped vehicle in line (e.g., the DSRC-equipped vehicle may include cameras that can take external pictures of the vehicle environment that may be used to determine how many vehicles are behind the DSRC-equipped vehicle in line); (6) a unique identifier of the drive-through business (this may be determined by cross-reference GPS data received from a DSRC-compliant GPS unit and a local directory of the vehicle navigation system); and (7) data describing the trajectory of the DSRC-equipped vehicle over the most recent 300 meters (approximately) and the time at which the DSRC-equipped vehicle was at various points on that trajectory.

In some implementations, the path history data may include information that may be used by the roadside service estimation system to determine one or more of the following: (1) how long the DSRC-equipped vehicle has been waiting in line; (2) how far the DSRC-equipped vehicle has traveled during the entire time period it has been waiting in line; (3) how far the DSRC-equipped vehicle has traveled in line during some fixed time period configured to capture recent changes in queue speed (e.g., 10 seconds, 11 seconds, etc.); (4) an estimate of how many vehicles are ahead of the DSRC-equipped vehicle in line (e.g., the DSRC-equipped vehicle may include cameras that can take external pictures of the vehicle environment that may be used to determine how many vehicles are ahead of the DSRC-equipped vehicle in line); (5) an estimate of how many vehicles are behind the DSRC-equipped vehicle in line (e.g., the DSRC-equipped vehicle may include cameras that can take external pictures of the vehicle environment that may be used to determine how many vehicles are behind the DSRC-equipped vehicle in line); (6) a unique identifier of the drive-through business (this may be determined by cross-reference GPS data received from a DSRC-compliant GPS unit and a local directory of the vehicle navigation system); and (7) data describing the trajectory of the DSRC-equipped vehicle over the most recent 300 meters (approximately) and the time at which the DSRC-equipped vehicle was at various points on that trajectory.

In some implementations, the path history data may be an element of the BSM data described below with reference to FIGS. 4A and 4B. The BSM data may be included in a BSM. The BSM may be transmitted or broadcasted via DSRC.

In some implementations, one or more of the elements of the BSM data may be included in a DSRC message. For example, a DSRC message may include the path history data for a DSRC-equipped vehicle.

Example Overview

FIGS. 1A through 1D are block diagrams illustrating example operating environments 100, 111, 112, 113 for a roadside service estimation system 199 according to some implementations.

Referring to FIG. 1A, the operating environment 100 may include one or more of the following elements: a first DSRC-equipped vehicle 123A; a second DSRC-equipped vehicle 123B; a delay time estimation system 198; and a delay time server 103. These elements of the operating environment 100 may be communicatively coupled to a network 105.

The first DSRC-equipped vehicle 123A and the second DSRC-equipped vehicle 123B may include the same or similar elements. The first DSRC-equipped vehicle 123A and the second DSRC-equipped vehicle 123B may be referred to collectively as "the DSRC-equipped vehicles 123" or individually as "the DSRC-equipped vehicle 123."

The DSRC-equipped vehicle 123 may include a car, a truck, a sports utility vehicle, a bus, a semi-truck, a drone or any other roadway-based conveyance. In some implementations, the DSRC-equipped vehicle 123 may include an autonomous vehicle or a semi-autonomous vehicle.

The DSRC-equipped vehicle 123 may include one or more of the following elements: a roadside service estimation system 199; a DSRC-compliant GPS unit 170; a path history module 180; and a DSRC module 190. The DSRC-equipped vehicle 123 may further include a non-transitory memory (not pictured) that stores one or more of the following elements: DSRC data 194; BSM data 195; path history data 196; delay time data 197; the roadside service estimation system 199; the DSRC-compliant GPS unit 170; the path history module 180; and the DSRC module 190.

Although not pictured in FIG. 1A, in some implementations the DSRC-equipped vehicle 123 may include an onboard vehicle computer system that is communicatively coupled to the roadside service estimation system 199 and the non-transitory memory. The onboard vehicle computer system may be operable to cause or control the operation of the roadside service estimation system 199. The onboard computer system may be operable to access and execute the data stored on the non-transitory memory. For example, the onboard computer system may be operable to access and execute one or more of the following: the roadside service estimation system 199; the DSRC-compliant GPS unit 170; the path history module 180; the DSRC module 190; the DSRC data 194; the BSM data 195; the path history data 196; and the delay time data 197.

The DSRC-equipped vehicle 123 may be on a roadway or waiting in a queue of a drive-through business. The functionality of the roadside service estimation system 199 may vary based on whether the DSRC-equipped vehicle 123 is present on a roadway or waiting in the queue of the drive-through business.

Assume the DSRC-equipped vehicle 123 is present in the queue of the drive-through business. In some implementations, the roadside service estimation system 199 may build a wireless message that includes any data that is needed for another DSRC-equipped vehicle 123 to provide a driver with a recommendation about whether they should stop at this drive-through business. For example, the roadside service estimation system 199 may include code and routines that are operable to build a wireless message that includes the path history data 196. The wireless message may include a DSRC message, a DSRC probe or a BSM.

Assume the DSRC-equipped vehicle 123 is present on the roadway. The roadside service estimation system 199 may include code and routines that are operable to provide a recommendation based on path history data 196 included in a wireless message that is received by the DSRC-equipped vehicle 123. The recommendation may describe an estimate of how long it would take to receive a service (which may include one or more goods) from a roadside business. The wireless message may include a DSRC message, a DSRC probe, a BSM or some other wireless message. The roadside service estimation system 199 may provide the recommendation to a driver of the DSRC-equipped vehicle 123.

The roadside service estimation system 199 may determine the recommendation based on the path history data 196 included in the wireless message. For example, the roadside service estimation system 199 may generate the delay time data 197 based on the path history data 196. The roadside service estimation system 199 may determine the recommendation based on the delay time data 197.

In some implementations, the roadside service estimation system 199 may be implemented using hardware including a field-programmable gate array ("FPGA") or an application-specific integrated circuit ("ASIC"). In some other implementations, the roadside service estimation system 199 may be implemented using a combination of hardware and software. The roadside service estimation system 199 may be stored in a combination of the devices (e.g., servers or other devices), or in one of the devices.

The roadside service estimation system 199 is described in more detail below with reference to FIG. 2.

The DSRC-compliant GPS unit 170 may include hardware that wirelessly communicates with a GPS satellite to retrieve GPS data that describes a location of the DSRC-equipped vehicle 123. In some implementations, a DSRC-compliant GPS unit 170 is operable to provide GPS data that describes the location of the DSRC-equipped vehicle 123 to a lane-level degree of precision. The DSRC standard requires that GPS data be precise enough to infer if two vehicles (such as DSRC-equipped vehicle 123 and another vehicle on the same roadway as the DSRC-equipped vehicle 123) are in the same lane. The lane may be a lane of a drive-through such as those depicted in FIGS. 1B, 1C and 1D. The DSRC-compliant GPS unit 170 may be operable to identify, monitor and track its two-dimensional position within 1.5 meters of its actual position 68% of the time under an open sky. Since lanes of a roadway (or a drive-through lane) are typically no less than 3 meters wide, whenever the two dimensional error of the GPS data is less than 1.5 meters the roadside service estimation system 199 may analyze the GPS data provided by the DSRC-compliant GPS unit 170 and determine what lane of the roadway (or drive-through) the DSRC-equipped vehicle 123 is traveling in based on the relative positions of vehicles on the roadway (or in the drive-through).

Figure 1B:
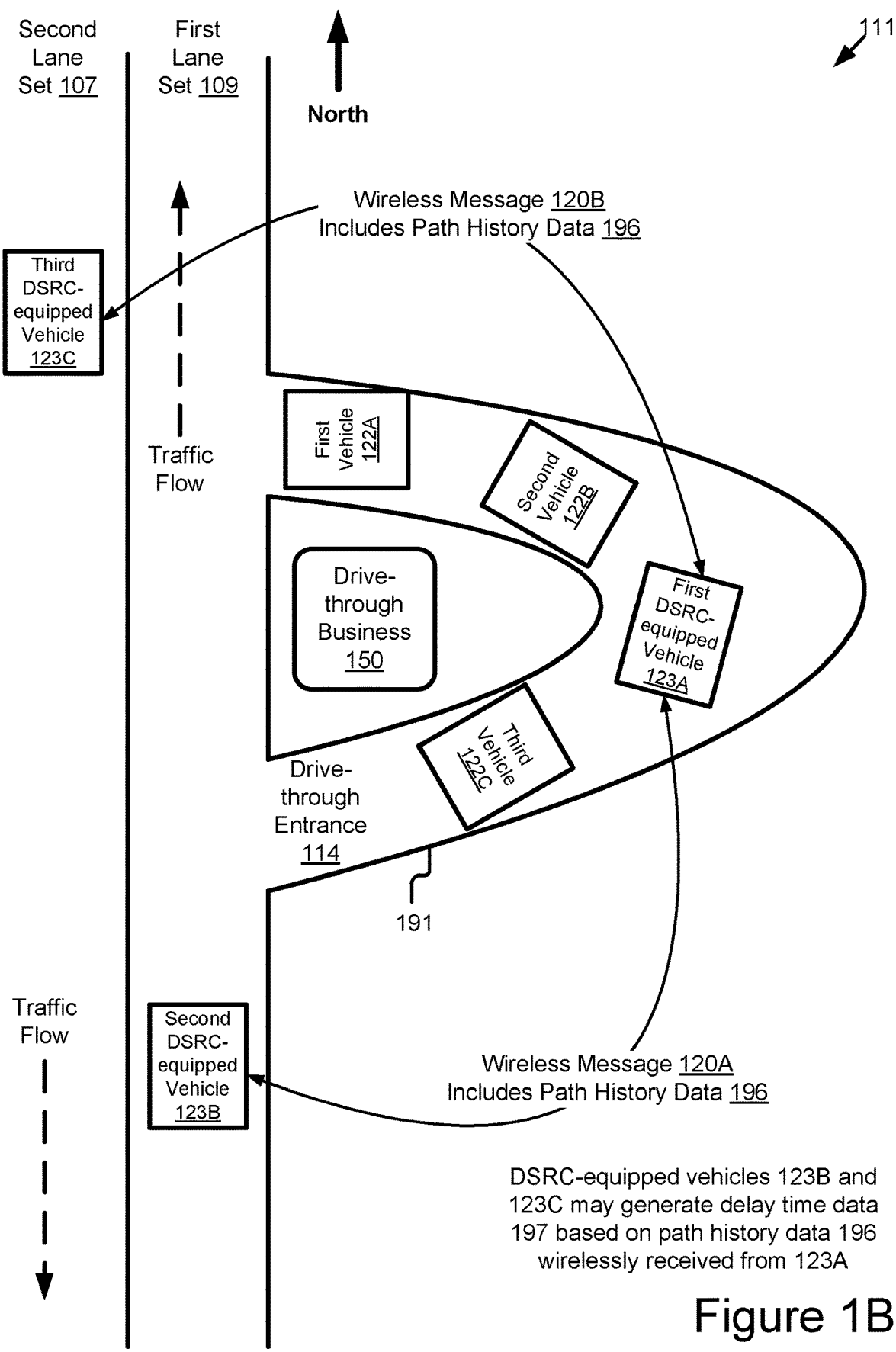

For example, referring now to FIG. 1B, the roadside service estimation system 199 may analyze the GPS data generated by the DSRC-compliant GPS unit 170 included in the first DSRC-equipped vehicle 123A and determine that the first DSRC-equipped vehicle 123A is traveling in the drive through of the drive-through business 150 based on the GPS data for the first DSRC-equipped vehicle 123A. By comparison, a GPS unit which is not compliant with the DSRC standard is far less accurate than the DSRC-compliant GPS unit 170 and not capable of reliably providing lane-level accuracy, as is the DSRC-compliant GPS unit 170. For example, a non-DSRC-compliant GPS unit may have an accuracy on the order of 10 meters, which is not sufficiently precise to provide the lane-level degree of precision provided by the DSRC-compliant GPS unit 170. For example, since a lane may be as narrow as 3 meters wide, the DSRC standard may require a DSRC-compliant GPS unit 170 to have an accuracy on the order of 1.5 meters, which is significantly more precise than a non-DSRC-compliant GPS unit as described above. As a result, a non-DSRC-compliant GPS unit may not be able to provide GPS data that is accurate enough for the roadside service estimation system 199 to generate accurate path history data 196 for the first DSRC-equipped vehicle 123A. The imprecision of a non-DSRC-compliant GPS unit may render the functionality of the roadside service estimation system 199 inoperable.

Referring now to FIG. 1A, in some implementations the GPS data retrieved by the DSRC-compliant GPS unit 170 may be an element of the path history data 196, the DSRC data 194 or the BSM data 195. Optionally, the GPS data may be stored as sensor data or some other data on the non-transitory memory of the DSRC-equipped vehicle 123A.

Figure 2:
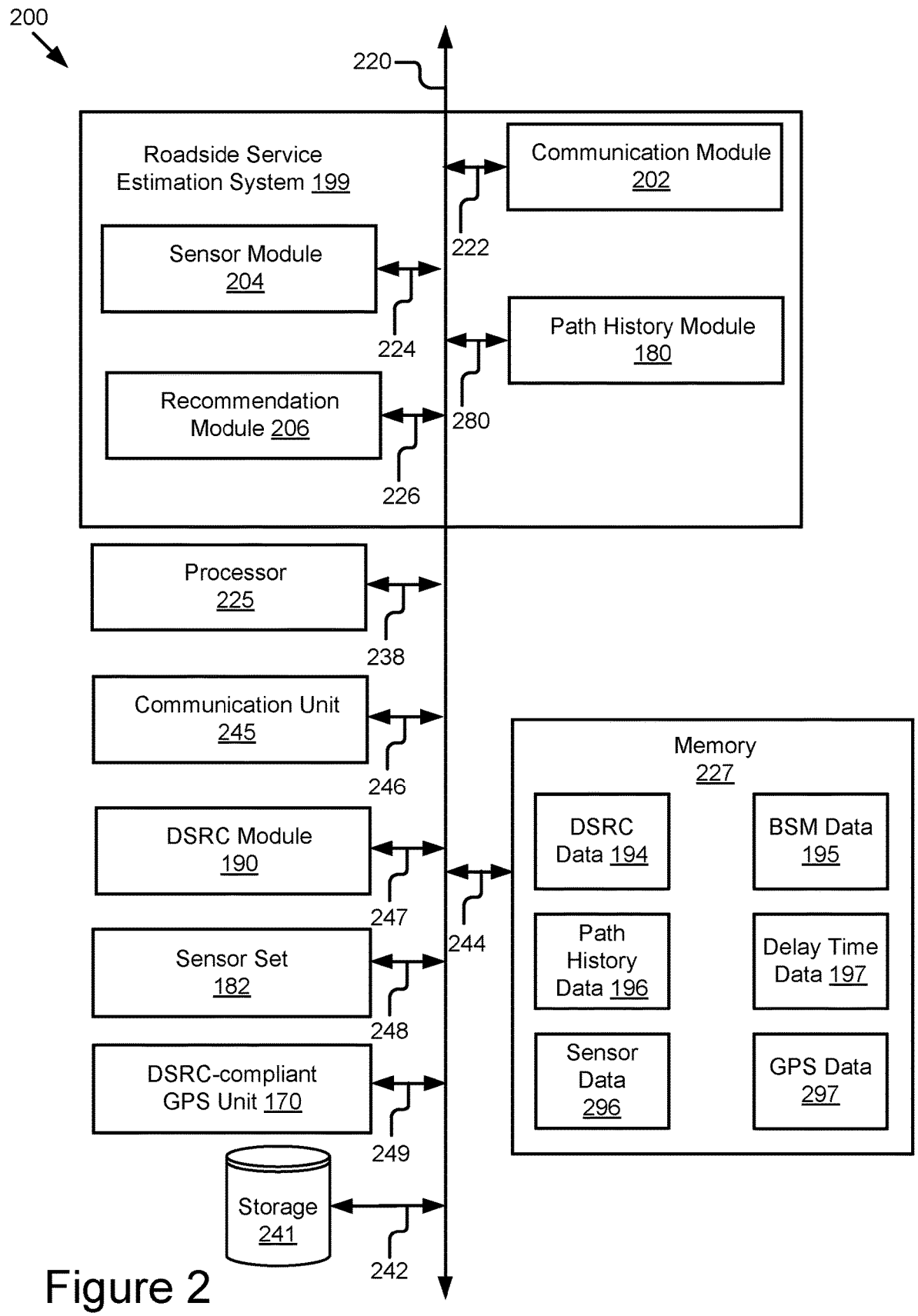
FIG. 2 is a block diagram illustrating an example computer system including a roadside service estimation system according to some implementations.

In some implementations, the GPS data may be an independent element that is stored on the non-transitory memory of the DSRC-equipped vehicle 123A (see, e.g., GPS data 297 depicted in FIG. 2).

Still referring to FIG. 1A, the path history module 180 may include code and routines that are operable to generate the path history data 196. For example, the DSRC-equipped vehicle 123A may include a sensor set 182. The sensor set 182 may include one or more sensors. The sensor set 182 may collect sensor data (see, e.g., sensor data 296 depicted in FIG. 2). The sensor data may describe, for example, the position of the DSRC-equipped vehicle 123A at a plurality of different times, how long the DSRC-equipped vehicle 123A has been in a queue of a drive-through, how far the DSRC-equipped vehicle 123A has traveled since entering the queue, how far the DSRC-equipped vehicle 123A has moved during some time interval, how many vehicles are ahead of the DSRC-equipped vehicle 123A in the queue or an estimate of the same, how many vehicles are behind the DSRC-equipped vehicle 123A in the queue or an estimate of the same, the average speed of the DSRC-equipped vehicle 123A while waiting in the queue, etc.

In some implementations, the path history module 180 may analyze one or more of the sensor data and the GPS data. The path history module 180 may generate the path history data 196 based on one or more of the sensor data and the GPS data. The GPS data may be an element of the sensor data. The GPS data may be time stamped. For example, the GPS data may describe the location of the DSRC-equipped vehicle at different points in time.

In some implementations, the path history data 196 may describe the location of the DSRC-equipped vehicle 123A at different points in time. For example, the path history module 180 may analyze the GPS data that describes the location of the DSRC-equipped vehicle 123A with lane-level precision at different points in time. The path history module 180 may generate the path history data 196 based in part on the GPS data.

In some implementations, the path history data 196 may include one or more entries. An entry may describe the location of the DSRC-equipped vehicle at a point in time.

In some implementations, each entry in the path history data 196 may include a data set formed from a location/time pair, i.e., (location, time). The location included in each data set may be the GPS coordinates of the DSRC-equipped vehicle 123A at a given time. The time included in each data set may optionally be a Universal Time value (UT) that is common to all systems and subsystems that use the path history data 196.

A first DSRC-equipped vehicle 123A may be present on a roadway. The first DSRC-equipped vehicle 123A may receive a wireless message such as a DSRC message, DSRC probe, BSM or some other wireless message. The wireless message may include path history data 196 for another device such as a second DSRC-equipped vehicle 123B that is present in a drive-through of a drive-through business. The second DSRC-equipped vehicle 123B may be waiting in a queue of the drive-through to receive a roadside service from the drive-through business. The path history data 196 may describe one or more locations of the second DSRC-equipped vehicle 123B at one or more points in time. The roadside service estimation system 199 of the first DSRC-equipped vehicle 123A may generate delay time data 197 based on the path history data 196 of the second DSRC-equipped vehicle 123B. The delay time data 197 may describe an estimate of how long the delay will be if the first DSRC-equipped vehicle 123A enters the same queue as the second DSRC-equipped vehicle 123B. The roadside service estimation system 199 may provide a recommendation to a driver of the first DSRC-equipped vehicle 123A based on the delay time data 197. The recommendation may describe the estimate of how long the delay will be if the first DSRC-equipped vehicle 123A enters the queue for the drive-through business.

The sensor set 182 may include one or more sensors that are operable to measure the physical environment outside of the DSRC-equipped vehicle 123. For example, the sensor set 182 may record one or more physical characteristics of the physical environment that is proximate to the DSRC-equipped vehicle 123.

In some implementations, the sensor set 182 may include one or more of the following vehicle sensors: a camera; a LIDAR sensor; a laser altimeter; a navigation sensor (e.g., a global positioning system sensor of the DSRC-compliant GPS unit 170); an infrared detector; a motion detector; a thermostat; a sound detector, a carbon monoxide sensor; a carbon dioxide sensor; an oxygen sensor; a mass air flow sensor; an engine coolant temperature sensor; a throttle position sensor; a crank shaft position sensor; an automobile engine sensor; a valve timer; an air-fuel ratio meter; a blind spot meter; a curb feeler; a defect detector; a Hall effect sensor, a manifold absolute pressure sensor; a parking sensor; a radar gun; a speedometer; a speed sensor; a tire-pressure monitoring sensor; a torque sensor; a transmission fluid temperature sensor; a turbine speed sensor (TSS); a variable reluctance sensor; a vehicle speed sensor (VSS); a water sensor; a wheel speed sensor; and any other type of automotive sensor.

The sensor set 182 may be operable to record sensor data that describes one or more locations of the DSRC-equipped vehicle 123A at one or more different times. An example of the sensor data is depicted in FIG. 2 as sensor data 296.

The DSRC module 190 may include a DSRC antenna. The DSRC antenna may include a DSRC transceiver and a DSRC receiver. The DSRC module 190 may be configured to broadcast a BSM at some fixed interval (every 10 to 15 seconds) that is user configurable.

In some implementations, the DSRC module 190 is an element of a communication unit 245 that is described in more detail below with reference to FIG. 2.

The DSRC data 194 may include any data that is included or encoded in a DSRC message or a DSRC probe. The DSRC data 194 may include one or more of the following:

one or more elements of the BSM data 195; the path history data 196; and the delay time data 197.

In some implementations, the DSRC data 194 may include BSM data 195, path history data 196 or delay time data 197 that is received from other DSRC-equipped vehicles 123. For example, the DSRC-equipped vehicle 123A may receive DSRC messages from other DSRC-equipped vehicles 123B that describes the path history data 196 of these other DSRC-equipped vehicles 123B and this information may be aggregated for retransmission to other DSRC-equipped devices.

The BSM data 195 may include any data that is included or encoded in a BSM. The BSM data 195 is described in more detail below with reference to FIGS. 4A and 4B.

Although not depicted in FIG. 1A, in some implementations the DSRC-equipped vehicle 123 may include a full-duplex coordination system as described in U.S. patent application Ser. No. 14/471,387 filed on Aug. 28, 2014 and entitled "Full-Duplex Coordination System," the entirety of which is herein incorporated by reference.

In some implementations, the full-duplex coordination system of the DSRC-equipped vehicle 123 may receive a full-duplex wireless message that includes path history data 196. The roadside service estimation system 199 may determine delay time data 197 based on the path history data 196.

The DSRC-equipped vehicle 123A may be communicatively coupled to the network 105.

The network 105 may be a conventional type, wired or wireless, and may have numerous different configurations including a star configuration, token ring configuration, or other configurations. Furthermore, the network 105 may include a local area network (LAN), a wide area network (WAN) (e.g., the Internet), or other interconnected data paths across which multiple devices and/or entities may communicate. In some implementations, the network 105 may include a peer-to-peer network. The network 105 may also be coupled to or may include portions of a telecommunications network for sending data in a variety of different communication protocols. In some implementations, the network 105 includes Bluetooth® communication networks or a cellular communications network for sending and receiving data including via short messaging service (SMS), multimedia messaging service (MMS), hypertext transfer protocol (HTTP), direct data connection, wireless application protocol (WAP), e-mail, DSRC, full-duplex wireless communication, etc. The network 105 may also include a mobile data network that may include third-generation (3G), fourth-generation (4G), long-term evolution (LTE), Voice-over-LTE ("VoLTE") or any other mobile data network or combination of mobile data networks. Further, the network 105 may include one or more IEEE 802.11 wireless networks.

In some implementations, the network 105 may include one or more communication channels shared among the DSRC-equipped vehicle 123 and one or more other wireless communication devices (e.g., other vehicles 123, an RSU, the delay time estimation system 198, the delay time server 103, etc.). The communication channel may include DSRC, full-duplex wireless communication or any other wireless communication protocol. For example, the network 105 may be used to transmit a DSRC message, DSRC probe or BSM to a DSRC-equipped vehicle 123.

The delay time server 103 may include a hardware server. The delay time server 103 may be communicatively coupled to the network 105. The delay time server 103 may include network communication capabilities. The delay time server 103 may be operable to send and receive messages via the network 105.

In some implementations, the first DSRC-equipped vehicle 123A may provide the path history data 196 to the delay time server 103 via the network 105. For example, the DSRC-equipped vehicle 123A may transmit a wireless message to the delay time server 103 via the network 105. The wireless message may include the path history data 196 for the first DSRC-equipped vehicle 123A, and possible other DSRC-equipped vehicles that have transmitted their path history data 196 to the first DSRC-equipped vehicle 123A. One or more other DSRC-equipped vehicles may also transmit their path history data 196 to the delay time server 103 via the network 105. The delay time server 103 may store and aggregate the path history data 196 received via the network 105 in a non-transitory memory to form the aggregated path history data 131.

The aggregated path history data 131 may include one or more sets of path history data 196 for one or more The aggregated path history data 131 may include one or more sets of path history data 196. The delay time estimation system 198 may include code and routines that are operable to receive the aggregated path history data 131 and output one or more sets of delay time data 133. The one or more sets of delay time data 133 may include a set of delay time data (similar to the delay time data 197) for each set of path history data 196 included in the aggregated path history data 131. The delay time server 103 may provide the one or more sets of delay time data (similar to the delay time data 197) to one or more vehicles such as the DSRC-equipped vehicles 123 or one or more non-DSRC-equipped vehicles that include network communication capabilities so that they are operable to receive a set of delay time data 133 from the delay time server 103 via the network 105.

In some implementations, the delay time data transmitted to the vehicles via the network 105 may be configured for the vehicle that receives the delay time data by the delay time estimation system 198. For example, the delay time estimation system 198 may receive a request for delay time data from a vehicle. The request may include GPS data describing a location of the vehicle. The path history data 196 included in the aggregated path history data 131 may include GPS data that is within a predetermined range of the vehicle (e.g., 10 meters, 100 meters, half a mile, 1 mile, etc.). The delay time estimation system 198 may include code and routines that are operable to receive the request, determine the location of the vehicle based on the GPS data included in the request and identify one or more sets of path history data 196 in the aggregated path history data 131 that is relevant to the request based on the GPS data included in the aggregated path history data 131. The delay time estimation system 198 may determine a set of delay time data 133 for the request based on the one or more sets of path history data 196 included in the aggregated path history data 131 that were determined to be relevant to the request. The delay time estimation system 198 may determine the set of delay time data 133 similar to how the roadside service estimation system 199 determines the delay time data 197 based on the path history data 196. The delay time estimation system 198 may respond to the request by transmitting a message that includes the set of delay time data 133 that is responsive to the request. The vehicle may include a roadside service estimation system 199. The roadside service estimation system 199 may provide the driver of the vehicle with a recommendation about whether to enter a drive through of a drive-through business based on the set of delay time data 133 received from the delay time server 103 via the network 105. One or more implementations of this process are described in more detail below with reference to FIG. 1C.

In this way the delay time estimation system 198 may provide delay time data 197 for one or more vehicles. These vehicles may be DSRC-equipped or non-DSRC-equipped vehicles that include network communication capabilities and are operable to receive a wireless message that includes the set of delay time data 133.

In some implementations the delay time estimation system 198 may be deployed as a static hardware device (e.g., a RSU) that is within DSRC range (e.g., substantially 1000 meters) of a DSRC-equipped vehicle 123 that is present in a drive through of a drive through business. In this way the delay time estimation system 198 may be deployed without the use of a delay time server 103. One or more implementations of this process are described in more detail below with reference to FIG. 1D.

In some implementations, the second DSRC-equipped vehicle 123B may include elements that are similar to the first DSRC-equipped vehicle 123A, and so, those descriptions will not be repeated here. The operating environment may include a plurality of DSRC-equipped vehicles 123 that each include a roadside service estimation system 199 and other elements that are similar to those described above for the first DSRC-equipped vehicle 123A. An example of an operating environment including a plurality of DSRC-equipped vehicles 123 that each include a roadside service estimation system 199 and other elements that are similar to those described above for the first DSRC-equipped vehicle 123A is shown in FIG. 1B.

Referring now to FIG. 1B, depicted is a block diagram illustrating an example operating environment 111 for a plurality of DSRC-equipped vehicles 123A, 123B, 123C including a roadside service estimation system 199 (e.g., a first roadside service estimation system 199A, a second roadside service estimation system 199B and a third roadside service estimation system 199C, respectively, for each of the DSRC-equipped vehicles 123A, 123B, 123C), according to some implementations. Each of the DSRC-equipped vehicles 123A, 123B, 123C may include elements that are similar to those described above for the first DSRC-equipped vehicle 123A, and so, those descriptions will not be repeated here.

In some implementations, the DSRC-equipped vehicles 123A, 123B, 123C may be of the same make (e.g., Toyota) so that the functionality described herein is only available to DSRC-equipped vehicles 123A, 123B, 123C of that make.

The operating environment 111 may also include a plurality of non-DSRC-equipped vehicles 122A, 122B and 122C. These vehicles 122A, 122B, 122C may include a car, bus, semi-truck, drone, or any other conveyance that is configured to operate on a roadway. These vehicles 122A, 122B, 122C may be referred to collectively as "vehicles 122" or individually as "a first vehicle 122A," "a second vehicle 122B" and "a third vehicle 122C." The vehicles 122 do not include a DSRC module 190 or any capability to communicate via DSRC or full-duplex wireless communication.

The operating environment 111 may include a roadway. In the depicted implementation, the roadway is configured so that traffic using the roadway travels in a substantially north-bound heading or a substantially south-bound heading. In other implementations, the roadway may be configured so that traffic travels in other directions than those depicted in FIG. 1B.

The roadway may include a first lane set 109 and a second lane set 107. The first lane set 109 may include one or more lanes of traffic that are configured so that traffic traveling in the first lane set 109 travel in a substantially north-bound heading.

The second lane set 107 may include one or more lanes of traffic that are configured so that traffic traveling in the second lane set 107 travel in a substantially south-bound heading.

In the depicted implementation, the roadway includes a drive-through business 150 including a drive-through entrance 114 accessible via one or more of the lanes included in the first lane set 109. The drive-through business 150 may include one or more of the following: a fuel station; a vehicle dealer that services vehicles; an oil change service; a tire rotation service; a restaurant; a fast-food restaurant; a bank; an ATM; a car wash; a parking lot; and any other business that may include a drive-through 191.

The drive-through 191 may include one or more lanes which are accessible by one or more DSRC-equipped vehicles 123 or one or more vehicles 122 that may form a line or a queue to wait for a roadside service from the drive-through business 150. The roadside service may include a good (e.g., a hamburger), a service (e.g., banking service, a car was service, a parking space for a period of time) or a combination of goods and a service (e.g., an oil change provides a good in the form of new oil and a new oil filter as well as a service by removing used oil and a used oil filter and replacing them with the new oil and the new oil filter).

In the depicted implementation, the second lane set 107 may include a third DSRC-equipped vehicle 123C and the first lane set 109 may include a second DSRC-equipped vehicle 123B. The drive-through may include a queue that includes the first DSRC-equipped vehicle 123A. A driver of the second DSRC-equipped vehicle 123B may be interested in entering the queue of the drive-through 191 to receive the roadside service offered by the drive-through business 150. Similarly, a driver of the third DSRC-equipped vehicle 123C may also be interested in entering the queue of the drive-through 191 to receive the roadside service offered by the drive-through business 150. The first DSRC-equipped vehicle 123A may have been present in the queue for a period of time. The first DSRC-equipped vehicle 123A may have generated path history data 196 that describes that period of time and the location of the first DSRC-equipped vehicle 123A at different points in time during that time period.

In some implementations, the first DSRC-equipped vehicle 123A may transmit a first wireless message 120A to the second DSRC-equipped vehicle 123B. The first wireless message 120A include a BSM, DSRC message, DSRC probe or any other DSRC-based wireless message. In some implementations, the first wireless message 120A may include a full-duplex wireless message. The first wireless message 120A will be either a DSRC-based message (e.g., a BSM, DSRC message or a DSRC probe) or a full-duplex wireless message as described in U.S. patent application Ser. No. 14/471,387 filed on Aug. 28, 2014 and entitled "Full-Duplex Coordination System."

The first wireless message 120A may include the path history data 196. For example, the first wireless message may include a BSM that includes the path history data 196 for the first DSRC-equipped vehicle 123A.

The second DSRC-equipped vehicle 123B may receive the first wireless message 120A. In this way, the roadside service estimation system 199 of the second DSRC-equipped vehicle 123B may receive the path history data 196 for the first DSRC-equipped vehicle 123A and provide the driver of the second DSRC-equipped vehicle 123B with a recommendation that describes an estimate of how long it will take the driver to receive the roadside service from the drive-through business 150 if the second DSRC-equipped vehicle 123B enters the queue for the drive-through 191 that is accessible via the drive-through entrance 114.

The second wireless message 120B may include features similar to the first wireless message 120A, and so, that description will not be repeated here. The third DSRC-equipped vehicle 123C may receive the second wireless message 120B. In this way, the roadside service estimation system 199 of the third DSRC-equipped vehicle 123C may receive the path history data 196 for the first DSRC-equipped vehicle 123A and provide the driver of the third DSRC-equipped vehicle 123C with a recommendation that describes an estimate of how long it will take the driver to receive the roadside service from the drive-through business 150 if the third DSRC-equipped vehicle 123C enters the queue for the drive-through 191 that is accessible via the drive-through entrance 114.

The above-described process for transmitting the first wireless message 120A and the second wireless message 120B will now be described in more detail according to some implementations.

In some implementations, the first DSRC-equipped vehicle 123A may collect sensor data. The sensor data may describe all the information needed to build the path history data 196 such as the location of the first DSRC-equipped vehicle 123A in the lane of the drive-through 191 at a plurality of times. The first DSRC-equipped vehicle 123A may include a first roadside service estimation system 199A that builds the path history data 196 based on the sensor data. Optionally, the first roadside service estimation system 199A may update the BSM data 195 of the first DSRC-equipped vehicle 123A to include the path history data 196. The first DSRC-equipped vehicle 123A may transmit or broadcast a first wireless message 120A and a second wireless message 120B that includes the path history data 196. The first wireless message 120A and the second wireless message 120B may be of different types. For example, the first wireless message 120A may be a BSM that includes the path history data 196 while the second wireless message may include a full-duplex wireless message or a DSRC probe that includes the path history data 196. The second DSRC-equipped vehicle 123B may receive the first wireless message 120A. The third DSRC-equipped vehicle 123C may receive the second wireless message 120B.

A second roadside service estimation system 199B of the second DSRC-equipped vehicle 123B may determine delay time data 197 based on the path history data 196 included in the first wireless message 120A. The second roadside service estimation system 199B may provide a recommendation to the driver of the second DSRC-equipped vehicle 123B based on the delay time data 197. The recommendation may describe an estimate of how long it will take the driver to receive the roadside service from the drive-through business 150 if the second DSRC-equipped vehicle 123B enters the queue for the drive-through 191 that is accessible via the drive-through entrance 114.

A third roadside service estimation system 199C of the third DSRC-equipped vehicle 123C may determine delay time data 197 based on the path history data 196 included in the second wireless message 120B. The third roadside service estimation system 199C may provide a recommendation to the driver of the third DSRC-equipped vehicle 123C based on the delay time data 197. The recommendation may describe an estimate of how long it will take the driver to receive the roadside service from the drive-through business 150 if the third DSRC-equipped vehicle 123C enters the queue for the drive-through 191 that is accessible via the drive-through entrance 114.

In some implementations, the first wireless message 120A or the second wireless message 120B may include the delay time data 197. For example, the first DSRC-equipped vehicle 123A may collect sensor data. The sensor data may describe all the information needed to build the path history data 196 such as the location of the first DSRC-equipped vehicle 123A in the lane of the drive-through 191 at a plurality of times. The first roadside service estimation system 199A of the first DSRC-equipped vehicle 123A may build the path history data 196 based on the sensor data. The first roadside service estimation system 199A may determine delay time data 197 based on the path history data 197. The first DSRC-equipped vehicle 123A may transmit or broadcast a first wireless message 120A and a second wireless message 120B that includes the delay time data 197 (and optionally the path history data 196). The first wireless message 120A and the second wireless message 120B may be of different types. For example, the first wireless message 120A may be a BSM that includes the delay time data 197 while the second wireless message may include a full-duplex wireless message or a DSRC probe that includes the delay time data 197. The second DSRC-equipped vehicle 123B may receive the first wireless message 120A. The third DSRC-equipped vehicle 123C may receive the second wireless message 120B.

The second roadside service estimation system 199B of the second DSRC-equipped vehicle 123B may determine a recommendation for the driver based on the delay time data 197 included in the first wireless message 120A. The third roadside service estimation system 199C of the third DSRC-equipped vehicle 123C may determine a recommendation for the driver of the third DSRC-equipped vehicle 123C based on the delay time data 197 included in the second wireless message 120B.

In some implementations, the second roadside service estimation system 199B or the third roadside service estimation system 199C may use confidence factors when determining their recommendation for the driver (or when generating their delay time data 197). For example, in FIG. 2 only one of the vehicles in the drive-through 191 includes DSRC, that is the first DSRC-equipped vehicle 123A. However, in practice, more than one vehicle in the drive-through 191 may be DSRC-equipped. In these embodiments, the second roadside service estimation system 199B or the third roadside service estimation system 199C may determine confidence factors based on how many sets of delay time data 197 are received and how these sets of delay time data 197 compare with one another (where an increased number of sets of path history data 196 corresponds to a higher confidence or a greater degree of similarity among the sets of path history data 196 may correspond to a higher confidence). The confidence factors may indicate a likelihood that the estimate of delay time described by the delay time data 197 is correct. The confidence in the estimate may be higher when more DSRC-equipped vehicles 123 report similar path history data 196 as it relates to a rate of travel (e.g., feet per minute, feet per second, etc.) while waiting in the drive-through 191.

In some implementations, the a DSRC-equipped vehicle 123 (such as the second DSRC-equipped vehicle 123B or the third DSRC-equipped vehicle 123C) may be considering entering the drive-through entrance 114. The DSRC-equipped vehicle 123 may receive the wireless message 120 including the path history data 196 for the first DSRC-equipped vehicle 123A. The path history data 196 may include a data structure that includes data that provides enough information for the roadside service estimation system 199 of the DSRC-equipped vehicle 123 present on the roadway to reconstruct a trajectory of the first DSRC-equipped vehicle 123A over the most recent 300 meters (or substantially the most recent 300 meters) and the time at which the first DSRC-equipped vehicle 123A was at various points on that trajectory. The time at which the first DSRC-equipped vehicle 123A was present a given position may be described by the path history data 196 with a range of up to substantially 11 minutes (or approximately 660 seconds).

The drive-through 191 may be curved (as in FIG. 1B) or substantially straight. When the drive-through 191 is curved, as many are, there may be a rich set of path history points included in the path history data 196, thereby providing the second roadside service estimation system 199B with a fine granularity of detail that may be used to determine the delay time data 197.

Frequently drive-through businesses 150 may be present on feeder roads that are located adjacent to a freeway. These feeder roads and drive-through businesses may be accessible by vehicles present on the freeway by accessing an exit ramp that leads to the feeder road. The roadway depicted in FIG. 1B may be a feeder road that includes the drive-through business 150. In some implementations, the first wireless message 120A or the second wireless message 120B may include a BSM (or some other wireless message) that is received over a range of several hundred meters, so the delay time data 197 or the recommendation may arrive at the DSRC-equipped vehicle 123 while this vehicle is still present on the freeway. This may be a time that is before the driver of the DSRC-equipped vehicle 123 present on the freeway is committed to entering the drive-through 191, possibly while the DSRC-equipped vehicle 123 present on the freeway is still traveling at a high speed on the freeway (e.g., before the DSRC-equipped vehicle 123 even exits the freeway to access the feeder road that includes the drive-through business 150).

In some implementations, the recommendation made based on the delay time data 197 may be triggered by a prior choice of the driver to navigate to a drive-through business 150.

Implementations that may include the operating environment 111 may beneficially require no servers such as the delay time server 103, or the expense and delay associated with the same. These implementations may also require no new standardization since they may utilize any BSM data 195 from any DSRC-equipped vehicle 123.

Figure 1C:
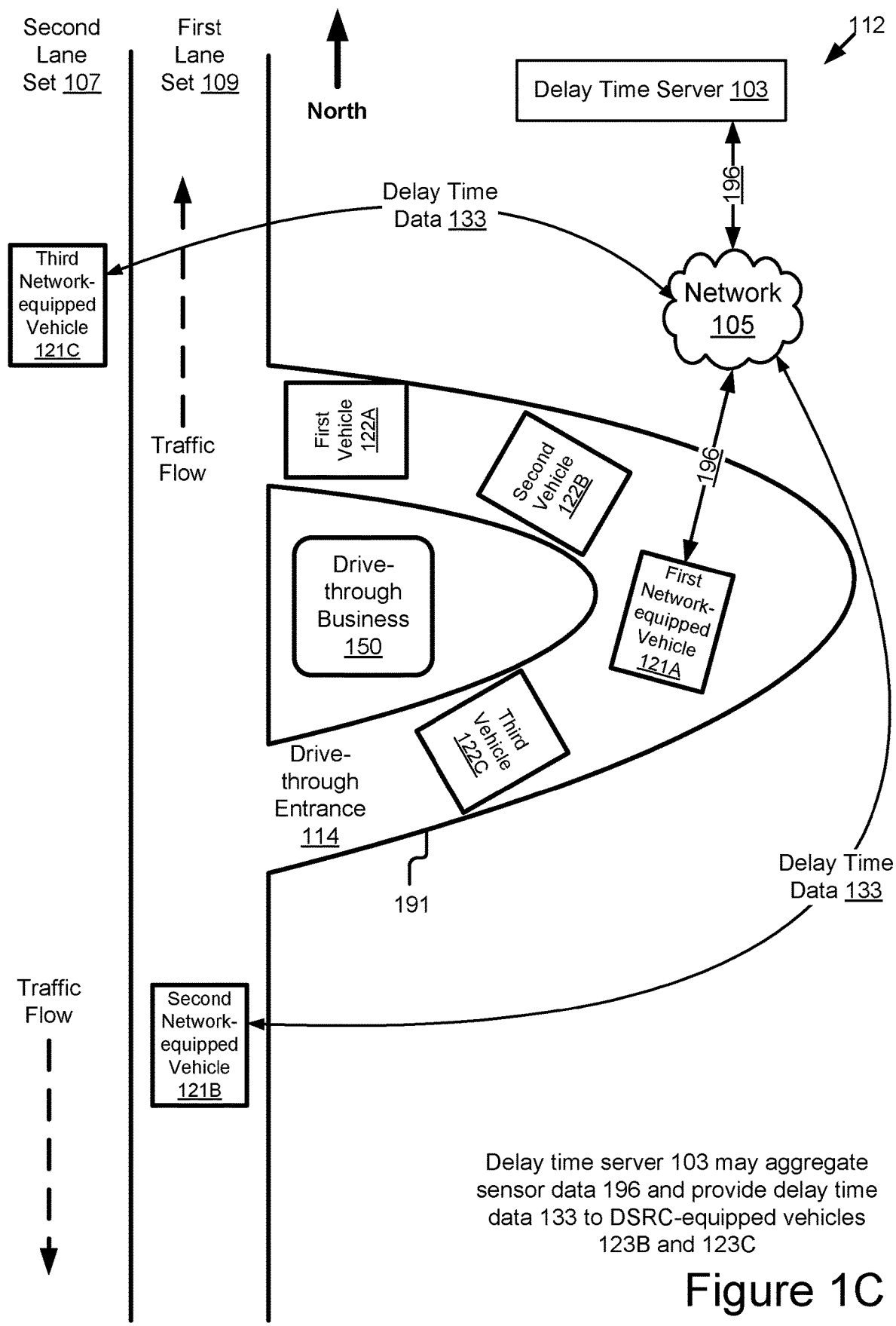

Referring now to FIG. 1C, depicted is a block diagram illustrating an example operating environment 112 for a plurality of network-equipped vehicles 121A, 121B, 121C including a roadside service estimation system 199 (e.g., a first roadside service estimation system 199A, a second roadside service estimation system 199B and a third roadside service estimation system 199C, respectively, for each of the network-equipped vehicles 121A, 121B, 121C), according to some implementations.

The operating environment 112 depicted in FIG. 1C includes the following elements that are similar to those described above for the operating environment 111 of FIG. 1B: a first lane set 109; a second lane set 107; a drive-through 191; a drive-through entrance 114; a drive-through business 150; a first vehicle 122A; a second vehicle 122B; and a third vehicle 122C. These elements were described above with reference to FIG. 1B, and so, those descriptions will not be repeated here.

The operating environment 112 also includes a network 105 and a delay time server 103. These elements were described above with reference to FIG. 1A, and so, those descriptions will not be repeated here.

In some implementations, the operating environment 112 includes one or more of the following: a first network-equipped vehicle 121A; a second network-equipped vehicle 121B; a third network-equipped vehicle 121C. These elements of the operating environment 112 may be collectively as the "network-equipped vehicles 121" or individually as "the network-equipped vehicle 121" or "the first network-equipped vehicle 121A," "the second network-equipped vehicle 121B" and "the third network-equipped vehicle 121C."

A network-equipped vehicle 121 may include any vehicle that is capable of wirelessly communicating with the network 105 and includes a roadside service estimation system 199. In some implementations, a network-equipped vehicle 121 may include any vehicle that includes a communication unit 245 as described below with reference to FIG. 2 and a roadside service estimation system 199 as described herein. In some implementations, one or more of the network-equipped vehicles 121 may be DSRC-equipped or include a full-duplex coordination system as described in U.S. patent application Ser. No. 14/471,387 filed on Aug. 28, 2014 and entitled "Full-Duplex Coordination System." In some implementations, the first network-equipped vehicle 121A may include a first roadside service estimation system 199A, the second network-equipped vehicle 121B may include a second roadside service estimation system 199B and a third network-equipped vehicle 121C may include a third roadside service estimation system 199C.

The operating environment 112 may include one or more implementations of the roadside service estimation system 199 that may be operable by a vehicle without the vehicle also being required to be DSRC-equipped. In some implementations, one or more of the network-equipped vehicles 121 may be DSRC-equipped or include a full-duplex coordination system as described in U.S. patent application Ser. No. 14/471,387 filed on Aug. 28, 2014 and entitled "Full-Duplex Coordination System" while other network-equipped vehicles 121 are not DSRC-equipped and do not include a full-duplex coordination system.

The first network-equipped vehicle 121A may transmit a wireless message to the delay time server 103 via the network 105. The wireless message may include the path history data 196 for the first network-equipped vehicle 121A. The delay time server 103 may then determine the delay time data 133. The delay time server 103 may transmit delay time data 133 to the second network-equipped vehicle 121B or the third network-equipped vehicle 121C via the network 105.

In some implementations, first network-equipped vehicle 121A may collect sensor data. The first network-equipped vehicle 121A may build path history data 196 based on sensor data.

The first network-equipped vehicle 121A may transmit the path history data 196 to the delay time server 103 via any wireless network (e.g., 3G, 4G, LTE, WiFi connection to the network 105 via a wireless router of the drive-through business 150, etc.).

In some implementations, the delay time server 103 may receive the path history data 196. The delay time server 103 may determine the delay time data 133 for the drive-through business 150 based on the path history data 196. The delay time data 133 may be valid for the drive-through business 150 for a predetermined period of time. The delay time server 103 may wirelessly transmit the delay time data 133 to the second network-equipped vehicle 121B or the third network-equipped vehicle 121C via the network 105.

The second roadside service estimation system 199B of the second network-equipped vehicle 121B may receive the delay time data 133 via the network 105. The second roadside service estimation system 199B may provide a recommendation to the driver of the second network-equipped vehicle 121B based on the delay time data 133 received via the network 105. The recommendation may describe how long it will take the driver to receive a roadside service from the drive-through business 150 should the driver choose to enter the drive-through 191.

The third roadside service estimation system 199C of the third network-equipped vehicle 121C may receive the delay time data 133 via the network 105. The second roadside service estimation system 199B may provide a recommendation to the driver of the third network-equipped vehicle 121C based on the delay time data 133 received via the network 105. The recommendation may describe how long it will take the driver to receive a roadside service from the drive-through business 150 should the driver choose to enter the drive-through 191.

In some implementations, the network-equipped vehicles 121 may be of the same make so that only network-equipped vehicles 121 of this make may benefit from the functionality of the roadside service estimation system 199 or the delay time server 103.

In some implementations, one or more of the network-equipped vehicles 121 may include a navigation system. The driver of the network-equipped vehicle 121 may request navigation options for one or more drive-through businesses 150. For example, the driver may request options for one or more drive-through businesses 150 and the navigation system may retrieve options. For each option, the navigation system may cause a display of the network-equipped vehicle 121 to display one or more of the following: a name of the drive-through business 150; a distance from a current location of the network-equipped vehicle 121 to a location of the drive-through business 150; and a recommendation that describes an estimate of a delay time for waiting in the drive-through of the drive-through business 150. The navigation system may provide the driver with a list (or some other data structure) that describes this information. The recommendation may be based on the path history data 196 of one or more network-equipped vehicles 121 or DSRC-equipped vehicles 123 that are present at these drive-through businesses 150. In this way, the driver may beneficially select an option (i.e., which drive-through business 150 they want to navigate to) with knowledge of how long their wait time might be based on the path history data 196 of actual network-equipped vehicles 121 or DSRC-equipped vehicles 123 that are or have been present at the selected drive-through business 150. The navigation system may then provide navigation instructions to the selected drive-through business 150 and, optionally, updates about that describe the estimated wait time for the selected drive-through business that are received while navigating to that drive-through business 150.

Figure 1D:
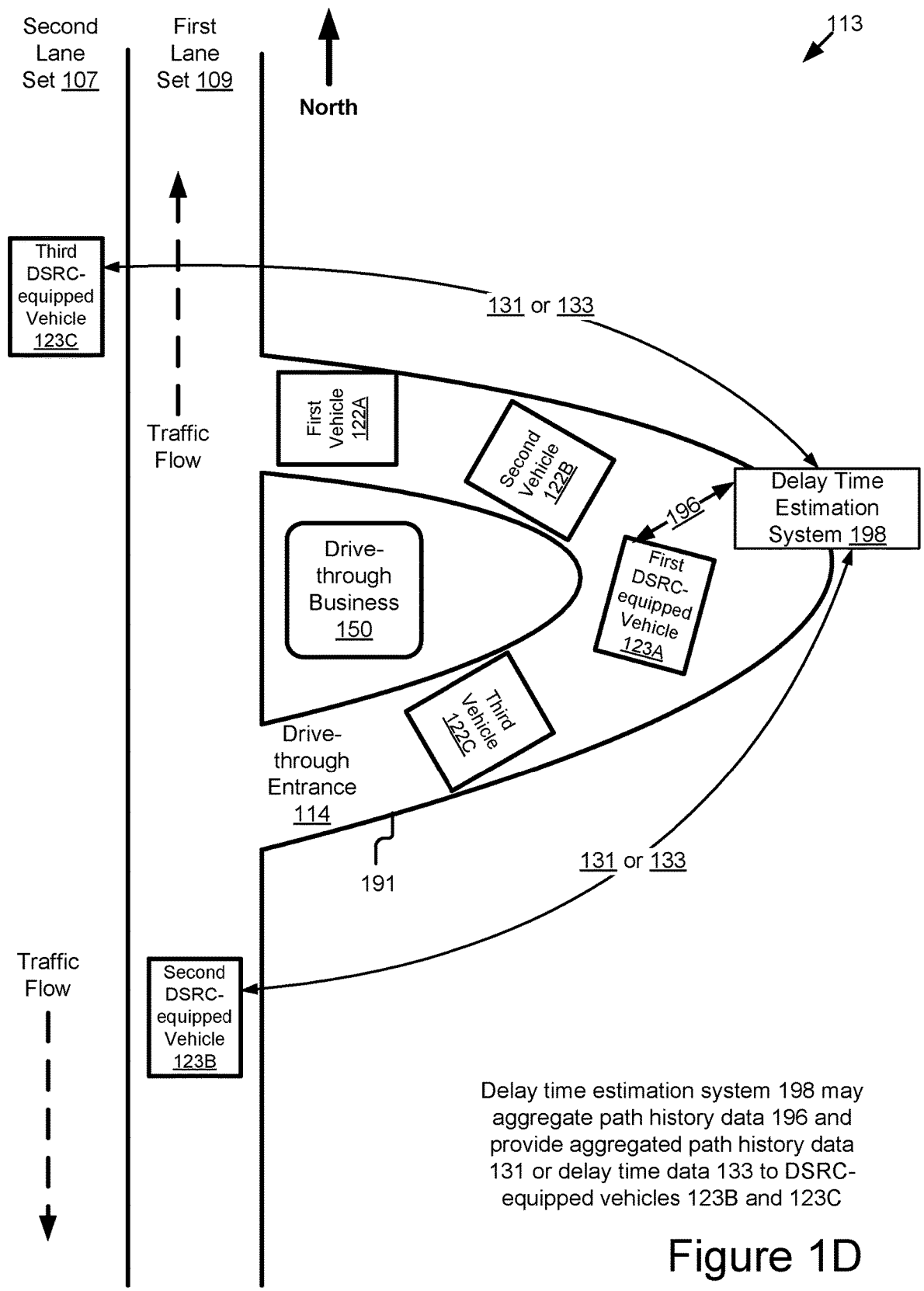

Referring now to FIG. 1D, depicted is a block diagram illustrating an example operating environment 113 for a plurality of DSRC-equipped vehicles 123A, 123B, 123C including a roadside service estimation system 199 (e.g., a first roadside service estimation system 199A, a second roadside service estimation system 199B and a third roadside service estimation system 199C, respectively, for each of the DSRC-equipped vehicles 123A, 123B, 123C), according to some implementations.

The delay time estimation system 198 may include a DSRC-equipped RSU that implements the delay time estimation system 198. The delay time estimation system 198 may be owned, managed or operated by the drive-through business 150 as a service to potential customers so that they may know an estimate of the wait time in the drive-through 191.

The first DSRC-equipped vehicle 123A may transmit a wireless message to the delay time estimation system 198 that includes the path history data 196 for the first DSRC-equipped vehicle 123A.

In some implementations, the delay time estimation system 198 may transmit a wireless message to the second DSRC-equipped vehicle 123B or the third DSRC-equipped vehicle 123C that includes one or more of the path history data 131 or the delay time data 133. Optionally, this wireless message may also include data that describes an advertisement for the drive-through business 150. For example, the advertisement may include data that describes the menu of services provided by the drive-through business. The advertisement may also describe an offer for the drive-through business 150. The offer may be triggered by path history data 131 or delay time data 133 that corresponds to a longer wait time. For example, the offer may be configured to encourage drivers to enter the drive-through 191 even though the estimated wait time for receiving a service is longer than usual or longer than the drive-through business 150 thinks the customer is ordinarily willing to accept.

In some implementations, the wireless message may be communicated via DSRC, 3G, 4G, LTE, WiFi™, full-duplex wireless messaging, etc. For example, the delay time estimation system 198 and one or more of the second DSRC-equipped vehicle 123B or the third DSRC-equipped vehicle 123C may include a full-duplex coordination system.

Referring now to FIG. 2, depicted is a block diagram illustrating an example computer system 200 including a roadside service estimation system 199 according to some implementations.

In some implementations, the computer system 200 may include a special-purpose computer system that is programmed to perform one or more steps of a method 300 or a method 399 described below with reference to FIGS. 3A and 3B.

In some implementations, the computer system 200 may include a DSRC-equipped vehicle 123, a network-equipped vehicle 121 or any vehicle that includes the roadside service estimation system 199.

In some implementations, the computer system 200 may include an onboard vehicle computer of the DSRC-equipped vehicle 123. In some implementations, the computer system 200 may include an engine control unit, head unit or some other processor-based computing device of the DSRC-equipped vehicle 123.

The computer system 200 may include one or more of the following elements according to some examples: the roadside service estimation system 199; a processor 225; a communication unit 245; the DSRC module 190; the sensor set 182; the DSRC-compliant GPS unit 170; a storage 241; and a memory 227. The components of the computer system 200 are communicatively coupled by a bus 220.

In the illustrated implementation, the processor 225 is communicatively coupled to the bus 220 via a signal line 238. The communication unit 245 is communicatively coupled to the bus 220 via a signal line 246. The DSRC module 190 is communicatively coupled to the bus 220 via a signal line 247. The sensor set 182 is communicatively coupled to the bus 220 via a signal line 248. A DSRC-compliant GPS unit 170 is communicatively coupled to the bus 220 via a signal line 249. The storage 241 is communicatively coupled to the bus 220 via a signal line 242. The memory 227 is communicatively coupled to the bus 220 via a signal line 244.

The DSRC module 190, the sensor set 182 and the DSRC-compliant GPS unit 170 were described above with reference to FIG. 1A, and so, those descriptions will not be repeated here.

The processor 225 includes an arithmetic logic unit, a microprocessor, a general purpose controller, or some other processor array to perform computations and provide electronic display signals to a display device. The processor 225 processes data signals and may include various computing architectures including a complex instruction set computer (CISC) architecture, a reduced instruction set computer (RISC) architecture, or an architecture implementing a combination of instruction sets. Although FIG. 2 includes a single processor 225, multiple processors may be included. Other processors, operating systems, sensors, displays, and physical configurations may be possible.

The memory 227 stores instructions or data that may be executed by the processor 225. The instructions or data may include code for performing the techniques described herein. The memory 227 may be a dynamic random access memory (DRAM) device, a static random access memory (SRAM) device, flash memory, or some other memory device. In some implementations, the memory 227 also includes a non-volatile memory or similar permanent storage device and media including a hard disk drive, a floppy disk drive, a CD-ROM device, a DVD-ROM device, a DVD-RAM device, a DVD-RW device, a flash memory device, or some other mass storage device for storing information on a more permanent basis.

As illustrated in FIG. 2, the memory 227 stores one or more of the following elements: the DSRC data 194; the BSM data 195; the path history data 196; the delay time data 197; sensor data 296; and GPS data 297. The following elements of the memory 227 are described above with reference to FIG. 1A-1D, and so, these descriptions will not be repeated here: the DSRC data 194; the BSM data 195; the path history data 196; and the delay time data 197.

The sensor data 296 may include data describing one or more physical measurements collected by one or more sensors of the sensor set 182.

The GPS data 297 may include location data received, generated or provided by the DSRC-compliant GPS unit 170.

The network 105 or the communication channel may include one or more of the following: a DSRC communication channel; a Wi-Fi™ network; a mobile network (3G, 4G, LTE, 5G); a full-duplex communication channel; or any other wireless network or communication channel. The communication unit 245 transmits and receives data to and from a network 105 or to another communication channel. The DSRC module 190 may be an element of the communication unit 245. For example, the communication unit 245 may include a DSRC transceiver, a DSRC receiver and other hardware or software necessary to make the computer system 200 a DSRC-enabled device.

In some implementations, the communication unit 245 includes a port for direct physical connection to the network 105 or to another communication channel. For example, the communication unit 245 includes a USB, SD, CAT-5, or similar port for wired communication with the network 105. In some implementations, the communication unit 245 includes a wireless transceiver for exchanging data with the network 105 or other communication channels using one or more wireless communication methods, including: IEEE 802.11; IEEE 802.16, BLUETOOTH®; EN ISO 14906: 2004 Electronic Fee Collection—Application interface EN 12253:2004 Dedicated Short-Range Communication—Physical layer using microwave at 5.8 GHz (review); EN 12795:2002 Dedicated Short-Range Communication (DSRC)—DSRC Data link layer: Medium Access and Logical Link Control (review); EN 12834:2002 Dedicated Short-Range Communication—Application layer (review); EN 13372:2004 Dedicated Short-Range Communication (DSRC)—DSRC profiles for RTTT applications (review); the communication method described in U.S. patent application Ser. No. 14/471,387 filed on Aug. 28, 2014 and entitled "Full-Duplex Coordination System"; or another suitable wireless communication method.

In some implementations, the communication unit 245 includes a cellular communications transceiver for sending and receiving data over a cellular communications network including via short messaging service (SMS), multimedia messaging service (MMS), hypertext transfer protocol (HTTP), direct data connection, WAP, e-mail, or another suitable type of electronic communication. In some implementations, the communication unit 245 includes a wired port and a wireless transceiver. The communication unit 245 also provides other conventional connections to the network 105 for distribution of files or media objects using standard network protocols including TCP/IP, HTTP, HTTPS, and SMTP, millimeter wave, DSRC, etc.

The storage 241 can be a non-transitory storage medium that stores data for providing the functionality described herein. The storage 241 may be a dynamic random access memory (DRAM) device, a static random access memory (SRAM) device, flash memory, or some other memory devices. In some implementations, the storage 241 also includes a non-volatile memory or similar permanent storage device and media including a hard disk drive, a floppy disk drive, a CD-ROM device, a DVD-ROM device, a DVD-RAM device, a DVD-RW device, a flash memory device, or some other mass storage device for storing information on a more permanent basis.

In the illustrated implementation shown in FIG. 2, the roadside service estimation system 199 includes a communication module 202, a sensor module 204, the path history module 180 and a recommendation module 206. These components of the roadside service estimation system 199 are communicatively coupled to each other via the bus 220. In some implementations, components of the roadside service estimation system 199 can be stored in a single server or device. In some other implementations, components of the roadside service estimation system 199 can be distributed and stored across multiple servers or devices.

The communication module 202 can be software including routines for handling communications between the roadside service estimation system 199 and other components of the computer system 200. In some implementations, the communication module 202 can be a set of instructions executable by the processor 225 to provide the functionality described below for handling communications between the roadside service estimation system 199 and other components of the computer system 200. In some implementations, the communication module 202 can be stored in the memory 227 of the computer system 200 and can be accessible and executable by the processor 225. The communication module 202 may be adapted for cooperation and communication with the processor 225 and other components of the computer system 200 via signal line 222.

The communication module 202 sends and receives data, via the communication unit 245, to and from one or more elements of the computer system 200 or the network 105. For example, the communication module 202 receives, via the communication unit 245, one or more of the following: the DSRC data 194; the BSM data 195; the path history data 196; the delay time data 197; the sensor data 296; and the GPS data 297.

In some implementations, the communication module 202 receives data from components of the roadside service estimation system 199 (or one or more of the example operating environments 101, 111, 112, 113) and stores the data in one or more of the storage 241 and the memory 227. For example, the communication module 202 receives the path history data 196 from the path history module 180 and stores the path history data 196 in the memory 227. In another example, the communication module 202 may receive the GPS data 297 from the DSRC-compliant GPS unit 170 and store the GPS data 297 in the memory 227.

In some implementations, the communication module 202 may handle communications between components of the roadside service estimation system 199. For example, the communications module 202 may handle communications between the sensor module 204 and the path history module 180.

The sensor module 204 can be software including routines for using one or more of the sensors included in the sensor set 182 to generate the sensor data 296. For example, the sensor module 204 may include code and routines that, when executed by the processor 225, cause the processor 225 to operate one or more of the sensors included in the sensor set 182 to record measurements of the physical environment proximate to the computer system 200 (e.g., a DSRC-equipped vehicle 123, a network-equipped vehicle 121 or any vehicle that includes the roadside service estimation system 199) and identify a path history or trajectory of the computer system 200.

In some implementations, the sensor module 204 may generate sensor data 296 describing the measurements of the sensor set 182. The sensor module 204 may cause the sensor data 296 to be stored in the memory 227. In some implementations, the sensor module 204 can be stored in the memory 227 of the computer system 200 and can be accessible and executable by the processor 225. The sensor module 204 may be adapted for cooperation and communication with the processor 225 and other components of the computer system 200 via the signal line 224.

The path history module 180 was described above with reference to FIGS. 1A through 1D, and so, this description will not be repeated here. The path history module 180 may analyze the sensor data 296 to determine a path or trajectory of the computer system 200. The path history module 180 may track the location of the computer system 200 in a drive-through over a period of time to determine a rate of travel of the computer system 200 in the drive-through. For example, the path history module 180 may determine how far the computer system 200 has traveled in a drive-through over a known period of time. The path history module 180 may generate the path history data 196 based on the sensor data 296.

In some implementations, the path history module 180 may determine how long the drive-through is based on satellite data that may be retrieved from the network 105 or the DSRC-compliant GPS unit 170. The satellite data may include images or other information that describes a length of the drive through. The path history module 180 may use the length of the drive-through and the rate of travel for the computer system 200 in the drive-through to determine an estimate of how many vehicles are in front of the computer system 200 in the drive-through or an estimate of how many vehicles are behind the computer system 200 in the drive-through. In some implementations, the sensor data 296 may include images that are used by the path history module 180 to determine one or more of the length of the drive-through, the estimate of how many vehicles are in front of the computer system 200 in the drive-through, and the estimate of how many vehicles are behind the computer system 200 in the drive-through. This data may be stored in the memory 227.

In some implementations, the path history module 180 may build a wireless message that includes the path history data 196. The path history module 180 may cause the communication unit 245 or the DSRC module 190 to transmit or broadcast the wireless message.

In some implementations, the path history module 180 can be stored in the memory 227 of the computer system 200 and can be accessible and executable by the processor 225. The path history module 180 may be adapted for cooperation and communication with the processor 225 and other components of the computer system 200 via signal line 280.

The recommendation module 206 can be software including routines for generating the delay time data 197 based on the path history data 196.

In some implementations, the recommendation module 206 may generate a recommendation that describes an estimate of how long it will take a user of the computer system 200 (e.g., a driver of a DSRC-equipped vehicle 123 or a network-equipped vehicle 121) to receive a roadside service from a drive-through business 150. The recommendation may be displayed as a graphical user interface on a monitor or provided as an audio that is provided to the user via one or more speakers. In some implementations, the recommendation module 206 can be stored in the memory 227 of the computer system 200 and can be accessible and executable by the processor 225. The recommendation module 206 may be adapted for cooperation and communication with the processor 225 and other components of the computer system 200 via signal line 226.

Figure 3A:
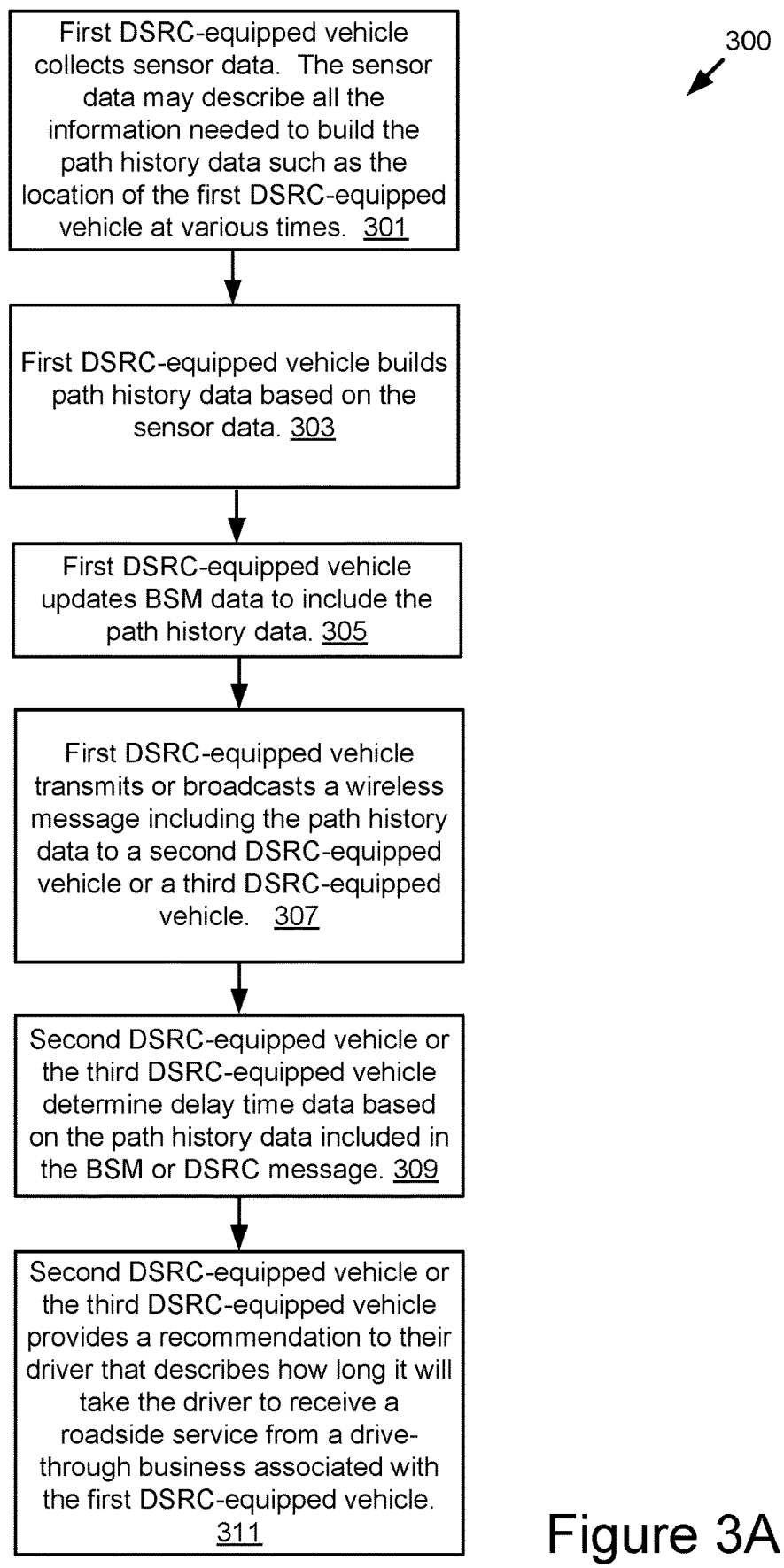
FIG. 3A is a flowchart of an example method for providing a recommendation including a roadside service estimate according to some implementations.

FIG. 3A is a flowchart of an example method 300 for providing a recommendation including a roadside service estimate according to some implementations. One or more of the steps described herein for the method 300 may be executed by one or more roadside service estimation systems.

At step 301, a first DSRC-equipped vehicle may collect sensor data. The sensor data may describe all the information needed to build the path history data for the first DSRC-equipped vehicle. The sensor data may describe the location of the DSRC-equipped vehicle at one or more times.

At step 303, the first DSRC-equipped vehicle may build the path history data based on the sensor data.

At step 305, the first DSRC-equipped vehicle may update BSM data to include the path history data.

At step 307, the first DSRC-equipped vehicle may transmit or broadcast a wireless message that includes the path history data. The wireless message may be transmitted or broadcasted to one or more of a second DSRC-equipped vehicle and a third-DSRC-equipped vehicle.

At step 309, the second DSRC-equipped vehicle or the third-DSRC-equipped vehicle may determine delay time data based on the path history data for the first DSRC-equipped vehicle.

At step 311, the second DSRC-equipped vehicle or the third-DSRC-equipped vehicle provides a recommendation to their driver. The recommendation may describe how long it will take the driver to receive a roadside service from a drive-through business associated with the first DSRC-equipped vehicle. The first DSRC-equipped vehicle may be present in a drive-through of the drive-through business at the present time or some earlier time.

Figure 3B:
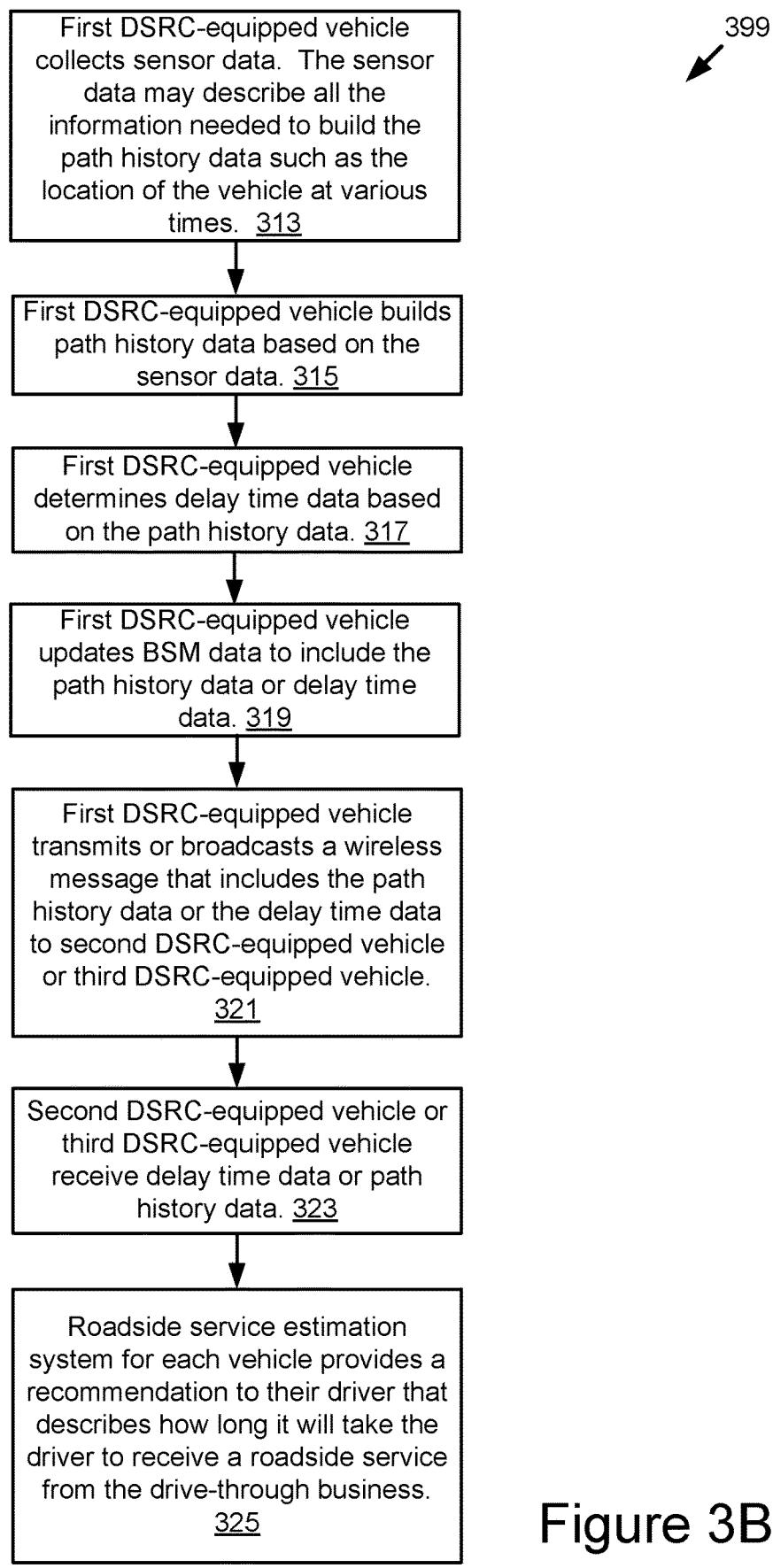
FIG. 3B is a flowchart of an example method for providing a recommendation including a roadside service estimate according to some implementations.

FIG. 3B is a flowchart of an example method 399 for providing a recommendation including a roadside service estimate according to some implementations. One or more of the steps described herein for the method 300 may be executed by one or more roadside service estimation systems.

At step 313, a first DSRC-equipped vehicle may collect sensor data. The sensor data may describe all the information needed to build the path history data for the first DSRC-equipped vehicle. The sensor data may describe the location of the DSRC-equipped vehicle at one or more times. The first DSRC-equipped vehicle may be present in a drive-through of a drive-through business.

At step 315, the first DSRC-equipped vehicle may build the path history data based on the sensor data.

At step 317, the first DSRC-equipped vehicle may determine delay time data associated with the drive-through business based on the path history data.

At step 319, the first DSRC-equipped vehicle may update BSM data to include the path history data or the delay time data.

At step 321, the first DSRC-equipped vehicle may transmit or broadcast a wireless message that includes the path history data or the delay time data. The wireless message may be transmitted or broadcasted to one or more of a second DSRC-equipped vehicle and a third-DSRC-equipped vehicle.

At step 323, the second DSRC-equipped vehicle or the third-DSRC-equipped vehicle may receive the determine delay time data or the path history data for the first DSRC-equipped vehicle.

At step 325, the second DSRC-equipped vehicle or the third-DSRC-equipped vehicle provides a recommendation to their driver. The recommendation may describe how long it will take the driver to receive a roadside service from a drive-through business associated with the first DSRC-equipped vehicle. The first DSRC-equipped vehicle may be present in a drive-through of the drive-through business at the present time or some earlier time.

Referring now to FIG. 4A, depicted is a block diagram illustrating an example of the BSM data 195 according to some implementations.

The regular interval for transmitting BSMs may be user configurable. In some implementations, a default setting for this interval may be transmitting the BSM every 0.10 seconds or substantially every 0.10 seconds.

A BSM may be broadcasted over the 5.9 GHz DSRC band. DSRC range may be substantially 1,000 meters. In some implementations, DSRC range may include a range of substantially 100 meters to substantially 1,000 meters.

Referring now to FIG. 4B, depicted is a block diagram illustrating an example of BSM data 195 according to some implementations.

A BSM may include two parts. These two parts may include different BSM data 195 as shown in FIG. 4B.

Part 1 of the BSM data 195 may describe one or more of the following: vehicle position; vehicle heading; vehicle speed; vehicle acceleration; vehicle steering wheel angle; and vehicle size.

Part 2 of the BSM data 195 may include a variable set of data elements drawn from a list of optional elements. Some of the BSM data 195 included in Part 2 of the BSM are selected based on event triggers, e.g., anti-locking brake system ("ABS") being activated may trigger BSM data 195 relevant to the ABS system of the vehicle.

In some implementations, some of the elements of Part 2 are transmitted less frequently in order to conserve bandwidth.

In some implementations, the BSM data 195 included in a BSM includes current snapshots of a vehicle traveling along a roadway system.

In some implementations, some or all of the information described above for the BSM data 195 may be included in the DSRC data 194.

One or more of the following devices may be a communication device: a DSRC-equipped vehicle 123; a network-equipped vehicle 121; a delay time server 103; and a delay time estimation system 198. Regarding U.S. patent application Ser. No. 14/471,387 filed on Aug. 28, 2014 and entitled "Full-Duplex Coordination System," in a half-duplex communication system, a first communication device currently transmitting data to a second communication device is not capable of simultaneously receiving data from the second communication device. If the second communication device has data to transmit to the first communication device, the second communication device needs to wait until the first communication device completes its data transmission. Only one communication device is allowed to transmit data at one time in the half-duplex communication system.

In a standard IEEE 802.11 Wireless Local Area Network (WLAN), communication devices may compete for access to a wireless channel based on the Carrier Sense Multiple Access with Collision Avoidance (CSMA/CA) Medium Access Control (MAC) protocol. The IEEE 802.11 MAC protocol requires that only one communication device may use the wireless channel to transmit data at one time. If two or more communication devices transmit data over the wireless channel at the same time, a collision occurs. As a result, only the communication device that currently gains access to the wireless channel may use the wireless channel to transmit data. Other communication devices having data to transmit need to monitor the wireless channel and may compete for access to the wireless channel when the wireless channel becomes idle again.

According to one innovative aspect of the subject matter described in this disclosure, the DSRC-equipped vehicle 123 (and other communication devices such as the network-equipped vehicle 121, delay time server 103 or delay time estimation system 198) may include a full duplex coordination system for implementing full-duplex wireless communications. The full duplex coordination system may include a processor and a memory storing instructions that, when executed, cause the full duplex coordination system to: create, at a first communication device (such as a first DSRC-equipped vehicle 123A, a first network-equipped vehicle 121A, etc.), first data (such as any combination of the data stored on the memory 227) to transmit to a second communication device (such as a second DSRC-equipped vehicle 123B, a second network-equipped vehicle 121B, a delay time estimation system 198, etc.); switch a half-duplex operation mode of the first communication device to a full-duplex operation mode to activate the full-duplex operation mode of the first communication device; transmit a first portion of the first data from the first communication device to the second communication device using a wireless channel; and transmit, in the full-duplex operation mode of the first communication device, a remaining portion of the first data to the second communication device while simultaneously receiving second data (such as any combination of the data stored on the memory 227) from the second communication device using the wireless channel.

According to another innovative aspect of the subject matter described in this disclosure, a full duplex coordination system for implementing full-duplex wireless communications includes a processor and a memory storing instructions that, when executed, cause the full duplex coordination system to: receive a first portion of first data (such as any combination of the data stored on the memory 227) from a first communication device via a wireless channel; determine that a second communication device is a single destination of the first data based on the first portion of the first data; determine that the second communication device has second data (such as any combination of the data stored on the memory 227) to transmit to the first communication device; determine that the first communication device has full-duplex communication capability; switch a half-duplex operation mode of the second communication device to a full-duplex operation mode to activate the full-duplex operation mode of the second communication device; and transmit, in the full-duplex operation mode of the second communication device, the second data to the first communication device while simultaneously receiving a remaining portion of the first data from the first communication device using the wireless channel.

In general, another innovative aspect of the subject matter described in this disclosure may be embodied in methods that include: creating, at a first communication device, first data to transmit to a second communication device; switching a half-duplex operation mode of the first communication device to a full-duplex operation mode to activate the full-duplex operation mode of the first communication device; transmitting a first portion of the first data from the first communication device to the second communication device using a wireless channel; and transmitting, in the full-duplex operation mode of the first communication device, a remaining portion of the first data to the second communication device while simultaneously receiving second data from the second communication device using the wireless channel.

Yet another innovative aspect of the subject matter described in this disclosure may be embodied in methods that include: receiving a first portion of first data from a first communication device via a wireless channel; determining that a second communication device is a single destination of the first data based on the first portion of the first data; determining that the second communication device has second data to transmit to the first communication device; determining that the first communication device has full-duplex communication capability; switching a half-duplex operation mode of the second communication device to a full-duplex operation mode to activate the full-duplex operation mode of the second communication device; and transmitting, in the full-duplex operation mode of the second communication device, the second data to the first communication device while simultaneously receiving a remaining portion of the first data from the first communication device using the wireless channel.

Another innovative aspect of the subject matter described in this disclosure may be embodied in methods that include: determining first data to transmit from a first communication device to a second communication device; and transmitting, from the first communication device that operates in a full-duplex operation mode, the first data to the second communication device while simultaneously receiving second data from the second communication device using a common wireless channel.

Another innovative aspect of the subject matter described in this disclosure may be embodied in methods that include: receiving, from a first communication device, first data at a second communication device via a wireless channel; determining second data to transmit from the second communication device to the first communication device responsive to receiving at least a portion of the first data; and transmitting, from the second communication device that operates in a full-duplex operation mode, the second data to the first communication device using the wireless channel while simultaneously receiving the first data from the first communication device.

Another innovative aspect of the subject matter described in this disclosure may be embodied in methods that include: determining, at a first communication device, first data to transmit to a second communication device; switching the first communication device from a half-duplex operation mode to a full-duplex operation mode; transmitting, in the full-duplex operation mode of the first communication device, the first data to the second communication device while simultaneously receiving second data from the second communication device using the wireless channel; and switching the full-duplex operation mode of the first communication device to the half-duplex operation mode responsive to a determination that transmission of the first data completes.

Another innovative aspect of the subject matter described in this disclosure may be embodied in methods that include: receiving, from a first communication device, first data at a second communication device via a wireless channel; determining that the second communication device has second data to transmit to the first communication device; switching the second communication device from a half-duplex operation mode to a full-duplex operation mode; transmitting, in the full-duplex operation mode of the second communication device, the second data to the first communication device while simultaneously receiving the first data from the first communication device using the wireless channel; and switching the full-duplex operation mode of the second communication device to the half-duplex operation mode responsive to a determination that transmission of the second data completes.

Other aspects include corresponding methods, systems, apparatus, and computer program products for these and other innovative aspects.

These and other implementations may each optionally include one or more of the following operations and features. For instance, the features include: the first data including a first packet and the first portion of the first data including a header portion of the first packet; the remaining portion of the first data including a payload portion and a trailer portion of the first packet; determining that the second communication device is a single destination of the first data; activating the full-duplex operation mode of the first communication device responsive to the second communication device being the single destination of the first data; the first communication device and the second communication device being communication devices in a wireless local area network; determining that the first communication device operates in a regulated spectrum where full-duplex communication capability is required; receiving device registry data associated with the first communication device; determining that the first communication device has full-duplex communication capability based on the device registry data; and determining that the first communication device has full-duplex communication capability based on a capability indication field in the first portion of the first data, the capability indication field including data describing whether the first communication device has full-duplex communication capability.

For instance, the operations include: determining that the wireless channel is idle; and accessing the wireless channel for data communication between the first communication device and the second communication device based on a channel access rule.

The disclosure is particularly advantageous in a number of respects. For example, the system described herein is capable of achieving a higher throughput and a faster communication speed using full-duplex communication technologies rather than using half-duplex communication technologies. The full-duplex communication may be implemented between vehicles (e.g., communication systems installed in DSRC-equipped vehicles 123 or network-equipped vehicles 121 such as those depicted in FIG. 1A, 1B, 1C or 1D) or other communication devices that have full-duplex communication capability. In another example, the system coordinates communication between communication devices in a distributed way without using a central coordinator. The system determines a pair of communication devices and coordinates simultaneous transmission of data between the pair of communication devices so that the pair of communication devices may transmit data to each other simultaneously using the same wireless channel. Meanwhile, other communication devices may not transmit data over the wireless channel to avoid collision. The advantages of the system described herein are provided by way of example, and the system may have numerous other advantages.

The disclosure includes a system and method for implementing full-duplex wireless communications between communication devices. A full-duplex coordination system may include a processor and a memory storing instructions that, when executed, cause the full-duplex coordination system to: create, at a first communication device, first data to transmit to a second communication device; switch a half-duplex operation mode of the first communication device to a full-duplex operation mode to activate the full-duplex operation mode of the first communication device; transmit a first portion of the first data from the first communication device to the second communication device using a wireless channel; and transmit, in the full-duplex operation mode of the first communication device, a remaining portion of the first data to the second communication device while simultaneously receiving second data from the second communication device using the wireless channel.

In the above description, for purposes of explanation, numerous specific details are set forth in order to provide a thorough understanding of the specification. It will be apparent, however, to one skilled in the art that the disclosure can be practiced without these specific details. In some instances, structures and devices are shown in block diagram form in order to avoid obscuring the description. For example, the present implementations can be described above primarily with reference to user interfaces and particular hardware. However, the present implementations can apply to any type of computer system that can receive data and commands, and any peripheral devices providing services.

Reference in the specification to "some implementations" or "some instances" means that a particular feature, structure, or characteristic described in connection with the implementations or instances can be included in at least one implementation of the description. The appearances of the phrase "in some implementations" in various places in the specification are not necessarily all referring to the same implementations.

Some portions of the detailed descriptions that follow are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms including "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission, or display devices.

The present implementations of the specification can also relate to an apparatus for performing the operations herein. This apparatus may be specially constructed for the required purposes, or it may include a general-purpose computer selectively activated or reconfigured by a computer program stored in the computer. Such a computer program may be stored in a computer-readable storage medium, including, but is not limited to, any type of disk including floppy disks, optical disks, CD-ROMs, and magnetic disks, read-only memories (ROMs), random access memories (RAMs), EPROMs, EEPROMs, magnetic or optical cards, flash memories including USB keys with non-volatile memory, or any type of media suitable for storing electronic instructions, each coupled to a computer system bus.

The specification can take the form of some entirely hardware implementations, some entirely software implementations or some implementations containing both hardware and software elements. In some preferred implementations, the specification is implemented in software, which includes, but is not limited to, firmware, resident software, microcode, etc.

Furthermore, the description can take the form of a computer program product accessible from a computer-usable or computer-readable medium providing program code for use by or in connection with a computer or any instruction execution system. For the purposes of this description, a computer-usable or computer-readable medium can be any apparatus that can contain, store, communicate, propagate, or transport the program for use by or in connection with the instruction execution system, apparatus, or device.

A data processing system suitable for storing or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including, but not limited, to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modem, and Ethernet cards are just a few of the currently available types of network adapters.

Finally, the algorithms and displays presented herein are not inherently related to any particular computer or other apparatus. Various general-purpose systems may be used with programs in accordance with the teachings herein, or it may prove convenient to construct more specialized apparatus to perform the required method steps. The required structure for a variety of these systems will appear from the description below. In addition, the specification is not described with reference to any particular programming language. It will be appreciated that a variety of programming languages may be used to implement the teachings of the specification as described herein.

The foregoing description of the implementations of the specification has been presented for the purposes of illustration and description. It is not intended to be exhaustive or to limit the specification to the precise form disclosed. Many modifications and variations are possible in light of the above teaching. It is intended that the scope of the disclosure be limited not by this detailed description, but rather by the claims of this application. As will be understood by those familiar with the art, the specification may be embodied in other specific forms without departing from the spirit or essential characteristics thereof. Likewise, the particular naming and division of the modules, routines, features, attributes, methodologies, and other aspects are not mandatory or significant, and the mechanisms that implement the specification or its features may have different names, divisions, or formats. Furthermore, as will be apparent to one of ordinary skill in the relevant art, the modules, routines, features, attributes, methodologies, and other aspects of the disclosure can be implemented as software, hardware, firmware, or any combination of the three. Also, wherever a component, an example of which is a module, of the specification is implemented as software, the component can be implemented as a standalone program, as part of a larger program, as a plurality of separate programs, as a statically or dynamically linked library, as a kernel-loadable module, as a device driver, or in every and any other way known now or in the future to those of ordinary skill in the art of computer programming. Additionally, the disclosure is in no way limited to implementation in any specific programming language, or for any specific operating system or environment. Accordingly, the disclosure is intended to be illustrative, but not limiting, of the scope of the specification, which is set forth in the following claims.

What is claimed is:

1. A method comprising:
creating, by a first onboard vehicle computer system of a first vehicle, a wireless message that includes path history data, wherein the path history data describes a rate of travel for the first vehicle present in a queue of a drive-through business that provides a roadside service and a lane of travel for the first vehicle within the queue based at least in part on global positioning data retrieved by a Global Positioning System unit wherein the global positioning data describes a location of the first vehicle with a lane-level precision at two or more different points in time so that the path history data has the lane-level precision, wherein the drive-through business includes one or more lanes and the lane-level precision is at least half a width of at least one of the lanes;
determining a length of the drive-through;
estimating by the first onboard vehicle computer system, based on the rate of travel, the lane of travel, and the length of the queue, delay time data describing (1) a first number of vehicles in front of the first vehicle in the queue of the drive-through to receive the roadside service and (2) a second number of vehicles behind the first vehicle in the queue to receive the roadside service; and
transmitting a wireless message including the delay time data to a second vehicle that is not present in the queue so that a second onboard vehicle computer of the second vehicle is operable to provide a recommendation about the queue wherein the recommendation is based on the delay time data included in the wireless message so that the recommendation is based at least in part on the lane-level precision of the path history data.

2. The method of claim 1, wherein the wireless message is a basic safety message that further describes a location of the first vehicle that is based on the global positioning data, a heading of the first vehicle, and an acceleration of the first vehicle.

3. The method of claim 1, wherein the path history data describes a plurality of different locations of the first vehicle that is accurate to within plus or minus 1.5 meters.

4. The method of claim 1, wherein the wireless message is transmitted responsive to the first vehicle receiving a request from the second vehicle.

5. The method of claim 1, wherein the length of the queue is determined based at least in part on satellite data that includes images that are retrieved from a network and the length of the drive-through is determined by a processor of the first vehicle based on satellite data.

6. The method of claim 1, wherein the wireless message is broadcast to a plurality of second vehicles.

7. The method of claim 1, wherein:
the path history data further describes (1) how long the first vehicle has been waiting in the queue, (2) how far the first vehicle has traveled while waiting in the queue, and (3) a second estimate of how many vehicles are ahead of the first vehicle in the queue.

8. A system for a first vehicle comprising:
a Global Positioning System unit having lane-level accuracy;
a first onboard vehicle computer system communicatively coupled to the Global Positioning System unit, wherein the first onboard vehicle computer system that includes a non-transitory memory storing computer code that, when executed by the first onboard vehicle computer system causes the first onboard vehicle computer system to:
  create a wireless message that includes path history data, wherein the path history data describes a rate of travel for the first vehicle present in a queue of a drive-through business that provides a roadside service and a lane of travel for the first vehicle within the queue based at least in part on global positioning data retrieved by the Global Positioning System unit wherein the global positioning data describes a location of the first vehicle with a lane-level precision at two or more different points in time so that the path history data has the lane-level precision, wherein the drive-through business includes one or more lanes and the lane-level precision is at least half a width of at least one of the lanes;
  determine a length of the drive-through;
  estimate by the first onboard computer system, based on the rate of travel, the lane of travel, and the length of the queue, delay time data describing (1) a first number of vehicles in front of the first vehicle in the queue of the drive-through to receive the roadside service and (2) a second number of vehicles behind the first vehicle in the queue to receive the roadside service; and
  transmit a wireless message including the delay time data to a second vehicle that is not present in the queue so that a second onboard vehicle computer of the second vehicle is operable to provide a recommendation about the queue based on the delay time data included in the wireless message so that the recommendation is based at least in part on the lane-level precision of the path history data.

9. The system of claim 8, wherein the wireless message is a basic safety message that further describes a location of the first vehicle that is based on the global positioning data, a trajectory of the first vehicle, and an acceleration of the first vehicle.

10. The system of claim 8, wherein the path history data describes a plurality of different locations of the first vehicle that is accurate to within plus or minus 1.5 meters.

11. The system of claim 8, wherein the second vehicle provides a recommendation about whether a driver should stop at the drive-through business based on the delay time data.

12. The system of claim 8, wherein the wireless message is broadcast to a plurality of second vehicles.

13. The system of claim 8, wherein:
  the path history data further describes (1) how long the first vehicle has been waiting in the queue, (2) how far the first vehicle has traveled while waiting in the queue, and (3) a second estimate of how many vehicles are ahead of the first vehicle in the queue.

14. A computer program product comprising a non-transitory computer-usable medium including a computer-readable program, wherein the computer-readable program when executed by a first onboard vehicle computer system causes the first onboard vehicle computer system to:
  create, by a first vehicle, a wireless message that includes path history data, wherein the path history data describes a rate of travel for the first vehicle present in a queue of a drive-through business that provides a roadside service-and a lane of travel for the first vehicle within the queue based at least in part on global positioning data retrieved by a Global Positioning System unit wherein the global positioning data describes a location of the first vehicle with a lane-level precision at two or more different points in time so that the path history data has the lane-level precision, wherein the drive-through business includes one or more lanes and the lane-level precision is at least half a width of at least one of the lanes;
  determine a length of the drive-through;
  estimate by the first onboard vehicle computer system, based on the rate of travel, the lane of travel, and the length of the drive-through, delay time data describing (1) a first number of vehicles in front of the first vehicle in the queue of the drive-through to receive the roadside service and (2) a second number of vehicles behind the first vehicle in the queue to receive the roadside service; and
  transmit a wireless message including the delay time data to a second vehicle that is not present in the queue so that an onboard vehicle computer of the second vehicle is operable to provide a recommendation about the queue wherein the recommendation is based on the delay time data included in the wireless message so that the recommendation is based at least in part on the lane-level precision of the path history data.

15. The computer program product of claim 14, wherein the wireless message is a basic safety message that further describes a location of the first vehicle that is based on the global positioning data, a heading of the first vehicle, and an acceleration of the first vehicle.

16. The computer program product of claim 14, wherein the path history data describes a plurality of different locations of the first vehicle that is accurate to within plus or minus 1.5 meters.

17. The computer program product of claim 14, wherein the wireless message is transmitted responsive to the first vehicle receiving a request from the second vehicle.

18. The computer program product of claim 14, wherein the length of the queue is determined based at least in part on satellite data.

19. The computer program product of claim 14, wherein the wireless message is broadcast to a plurality of second vehicles.

20. The computer program product of claim 14, wherein:
  the path history data further describes (1) how long the first vehicle has been waiting in the queue, (2) how far the first vehicle has traveled while waiting in the queue, and (3) a second estimate of how many vehicles are ahead of the first vehicle in the queue a second estimate of how many vehicles are behind the first vehicle in the queue.

* * * * *